(12) United States Patent
Yeo et al.

(10) Patent No.: US 11,592,158 B2
(45) Date of Patent: Feb. 28, 2023

(54) LIGHTING ARRANGEMENT WITH OPTICAL COMPOSITE FOR TARGETED ILLUMINATION PATTERNS

(71) Applicant: Fusion Optix, Inc., Woburn, MA (US)

(72) Inventors: Terence Yeo, Boston, MA (US); John Montminy, Pelham, NH (US); Michael Demas, Charlestown, MA (US); Lee Mantha, Lawrence, MA (US); Timothy Kelly, Brookline, MA (US)

(73) Assignee: Fusion Optix, Inc., Woburn, MA (US)

( * ) Notice: Subject to any disclaimer, the term of this patent is extended or adjusted under 35 U.S.C. 154(b) by 0 days.

(21) Appl. No.: 16/857,170

(22) Filed: Apr. 23, 2020

(65) Prior Publication Data

US 2020/0355345 A1 Nov. 12, 2020

Related U.S. Application Data

(60) Provisional application No. 62/837,534, filed on Apr. 23, 2019.

(51) Int. Cl.
*F21V 5/04* (2006.01)
*G02B 5/32* (2006.01)
*G02B 3/08* (2006.01)
*F21Y 115/15* (2016.01)

(52) U.S. Cl.
CPC .............. *F21V 5/045* (2013.01); *G02B 3/08* (2013.01); *G02B 5/32* (2013.01); *F21Y 2115/15* (2016.08)

(58) Field of Classification Search
CPC ........... F21V 5/045; F21V 7/005; G02B 3/08; G02B 5/32
See application file for complete search history.

(56) References Cited

U.S. PATENT DOCUMENTS

| | | | |
|---|---|---|---|
| 2006/0221592 A1* | 10/2006 | Nada ........................ | H01L 33/22 362/97.3 |
| 2009/0207586 A1* | 8/2009 | Arai .................... | G02B 19/0066 362/311.09 |
| 2010/0097803 A1* | 4/2010 | Wu .......................... | F21V 5/007 362/244 |

(Continued)

*Primary Examiner* — Andrew J Coughlin
*Assistant Examiner* — Nathaniel J Lee

(57) ABSTRACT

The present disclosure discloses a lighting arrangement with optical composite that provides, when in operation, more uniform angular light distribution emissions into an environment. Lighting arrangements employing the novel optical composite in conjunction with LED light sources provide direct and indirect illumination with more uniform angular light distribution emissions into application environments. An optically coupled opaque layer suppresses internal reflections of ambient light to improve visual appearance of the optical composite by reducing peak brightness and brightness non-uniformity. In specific embodiments, low visibility matte appearances are achieved that are aesthetically desirable in the "off" (unlit) state.

The present disclosure provides a solution to problems of non-uniform angular distribution of light causing visual discomfort and spatial discontinuity in output. Energy savings are achieved with high optical efficiency utilizing compact, durable, robust, and aesthetically appealing optical composites and lighting arrangements capable of providing an assortment of configurable angular light distributions.

30 Claims, 28 Drawing Sheets

(56) References Cited

U.S. PATENT DOCUMENTS

| | | | |
|---|---|---|---|
| 2010/0277908 A1* | 11/2010 | Hu | F21V 5/00 362/249.02 |
| 2011/0141729 A1* | 6/2011 | Yang | F21V 17/104 362/235 |
| 2011/0317414 A1* | 12/2011 | Marfeld | G02B 19/0066 362/235 |
| 2012/0275150 A1* | 11/2012 | Yokotani | F21V 9/08 362/235 |
| 2015/0042891 A1* | 2/2015 | Shimizu | H04N 5/44 362/235 |
| 2017/0212338 A1* | 7/2017 | Vissenberg | F21V 3/02 |
| 2017/0227204 A1* | 8/2017 | May | H05B 47/185 |

* cited by examiner 2000  120.3°  2010

161.5

2040   154.5°  2050

2060   165.8°   2070

2080   159.7°   2090

2100   158.7°   2110

| Embodiment | Optic | Reflector Type | Optic Notes | Efficacy [lm/W] | Normalized Ranking (%) | %Loss | Peak [cd] | Beam Angle [deg.] | Comments |
|---|---|---|---|---|---|---|---|---|---|
| Ref | LED Board Only / No Optic | White Reflective Coating on PCB | No optic | 187 | 100.0% | 0 | 305 | 120.3 | - |
| A7 | Wide-Angle Optic | White UV cured coating on opposing surface | White Coating on bottom of optic | 176 | 94.1% | 5.9% | 311 | 154.5 | |
| A1 | Wide-Angle Optic + internal feature | White diffuse reflective film | White film with adhesive on opposing face of optic | 174 | 93.0% | 7.0% | 358 | 151.2 | |
| A13 | Wide-Angle Optic | White + PMMA2020 Film | - | 174 | 93.0% | 7.0% | 330 | 157.7 | |
| A16 | Wide-Angle Optic | White reflective coating | - | 174 | 93.0% | 7.0% | 311 | 159.5 | |
| A2 | Wide-Angle Optic + internal feature | White Reflective Coating on PCB | White film with adhesive on opposing face of optic | 173 | 92.5% | 7.5% | 321 | 152.4 | |
| A3 | Wide-Angle Optic + internal feature | White Reflective Coating on PCB | White film with adhesive on opposing face of optic | 173 | 92.5% | 7.5% | 330 | 152.8 | |
| A11 | Wide-Angle Optic | Specular Alanod | - | 173 | 92.5% | 7.5% | 344 | 156.6 | Specular gives higher peak and "thicker" distribution |
| A4 | Wide-Angle Optic + internal feature | White Reflective Film | - | 168 | 89.8% | 10.2% | 328 | 156.3 | - |
| A8 | Wide-Angle Flat-top Optic | White UV cured coating on opposing surface | Embossed lenticular film laminated to top | 165 | 88.2% | 11.8% | 241 | 158.7 | Brings out light at top of distribution |
| A9 | Wide-Angle Optic | White Reflective Coating on PCB | | 161 | 86.1% | 13.9% | 302 | 161.5 | Default Reflector- White LED Board Only |
| A15 | Wide-Angle Optic | White + PMMA2020 Film | Embossed Lenticular "tented" over Optic | 158 | 84.5% | 15.5% | 305 | 143.2 | Lenticular film smooths center of distribution |
| A6 | Wide-Angle Optic | Black | - | 148 | 79.1% | 20.9% | 281 | 165.8 | - |
| A5 | Wide-Angle Optic | Black | Bottom of optic blacked-out | 134 | 71.7% | 28.3% | 302 | 159.7 | - |

FIG. 15

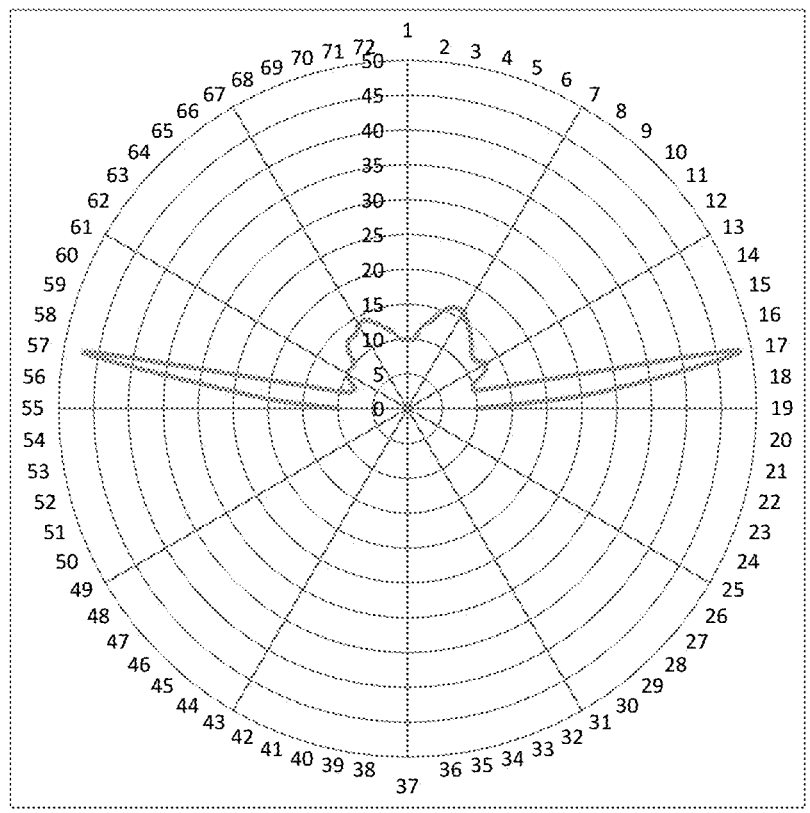
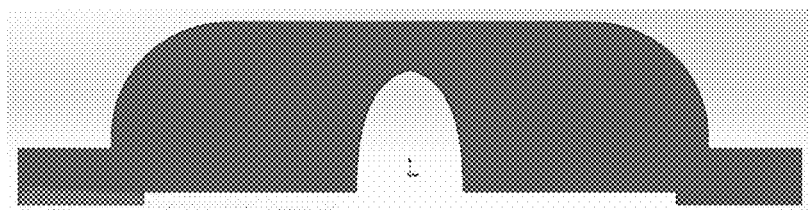
FIG. 20

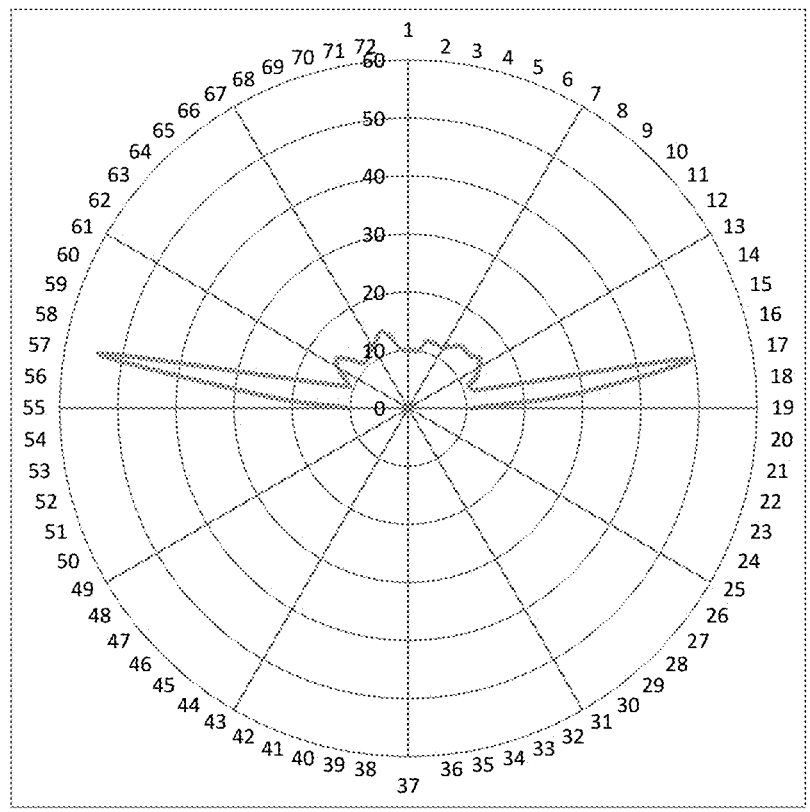
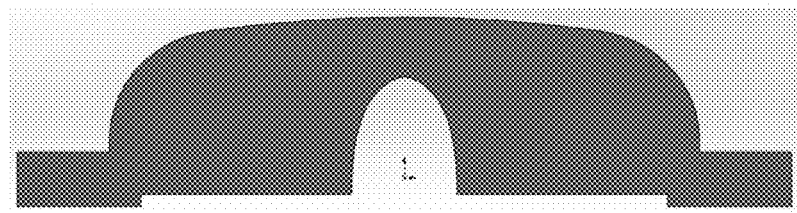
FIG. 21

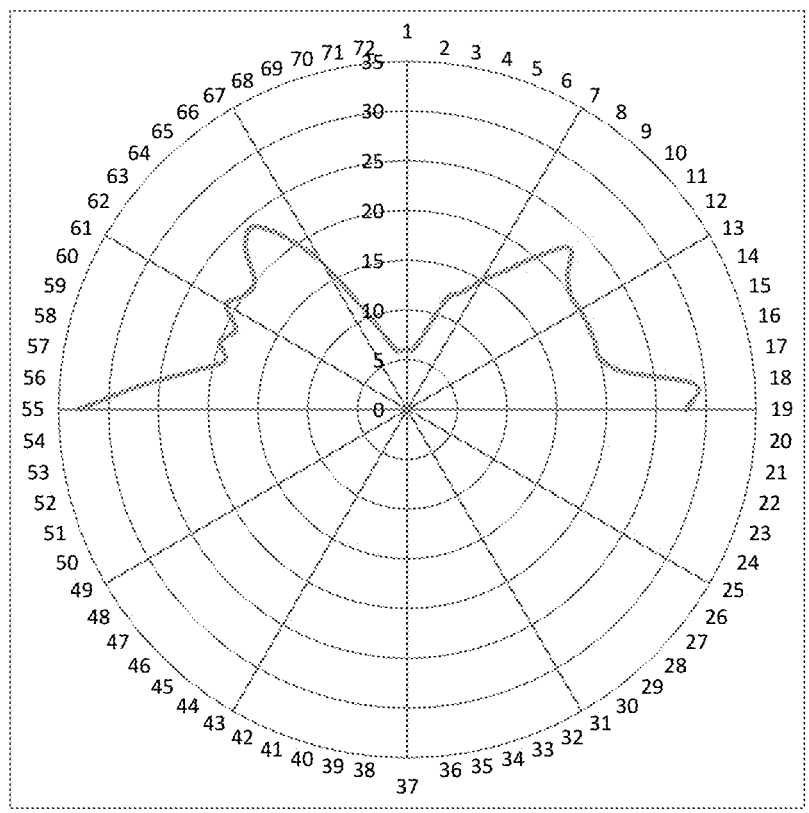
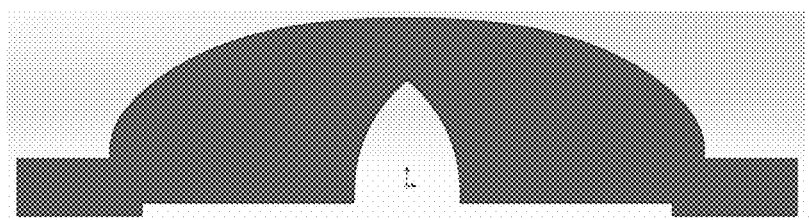
FIG. 22

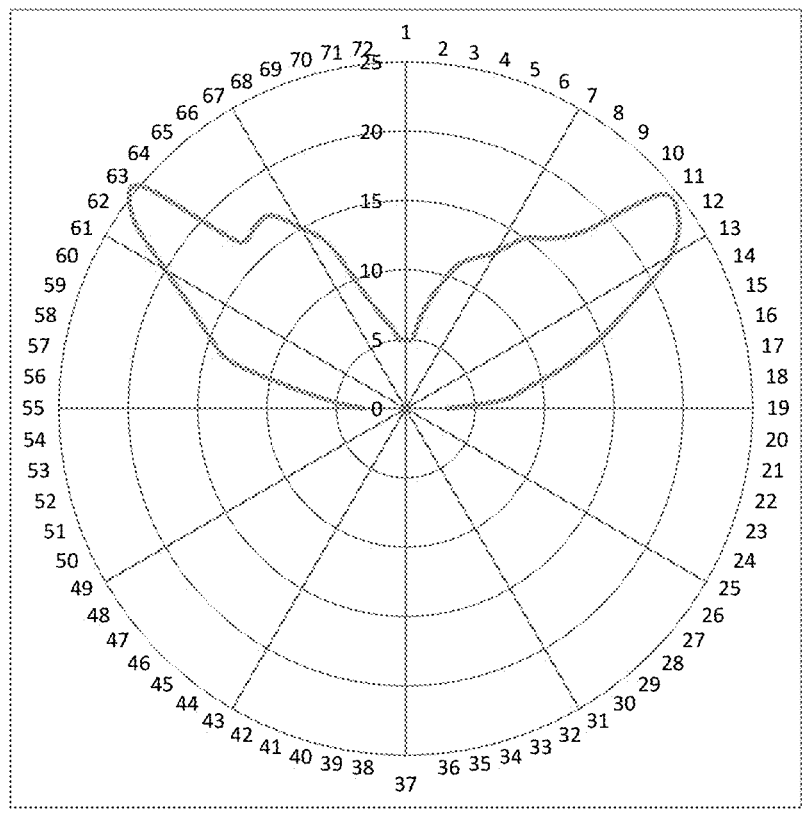
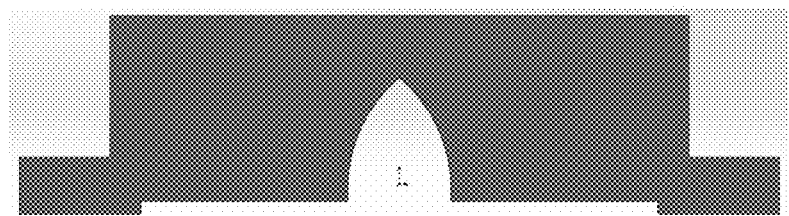
FIG. 23

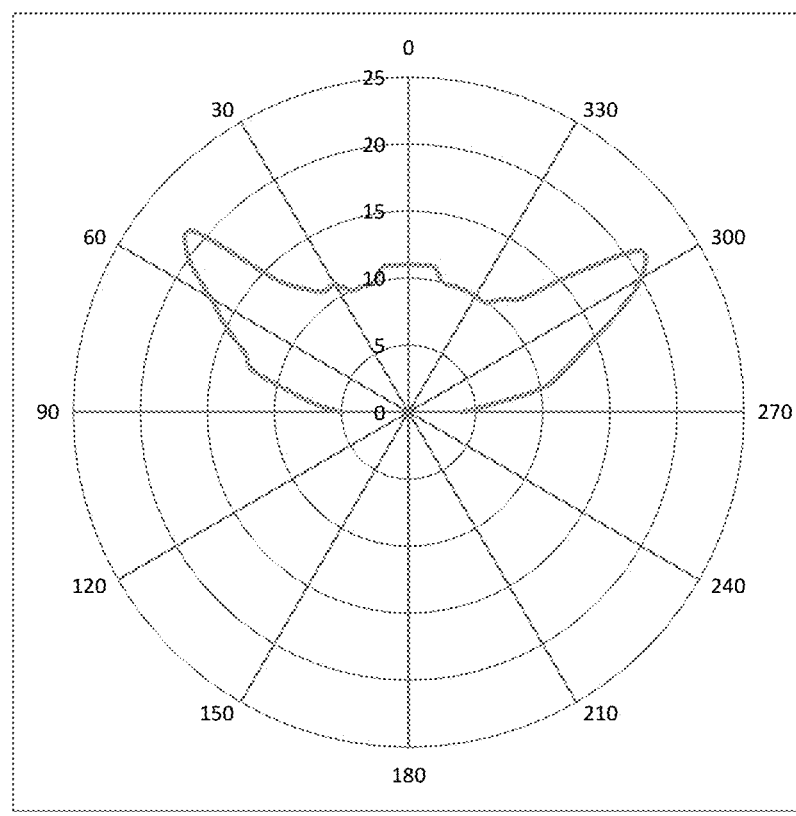
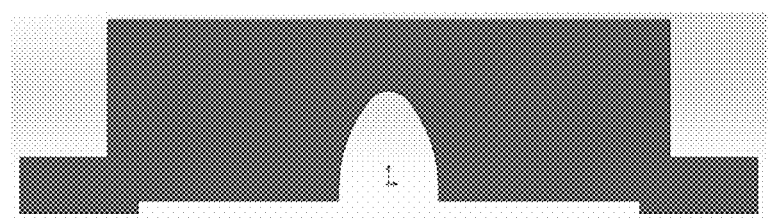
FIG. 24

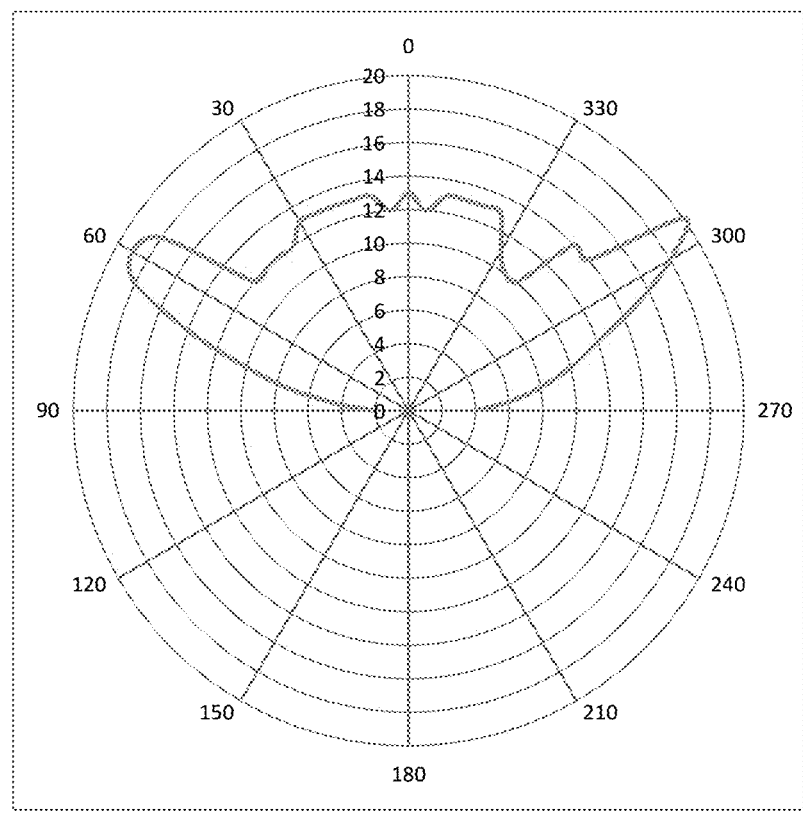
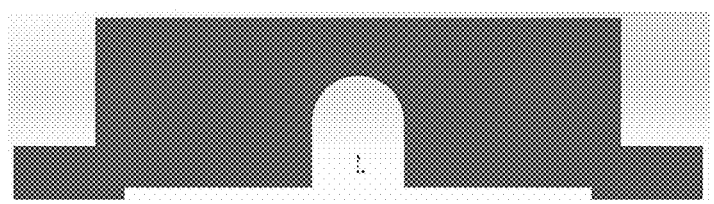
FIG. 25

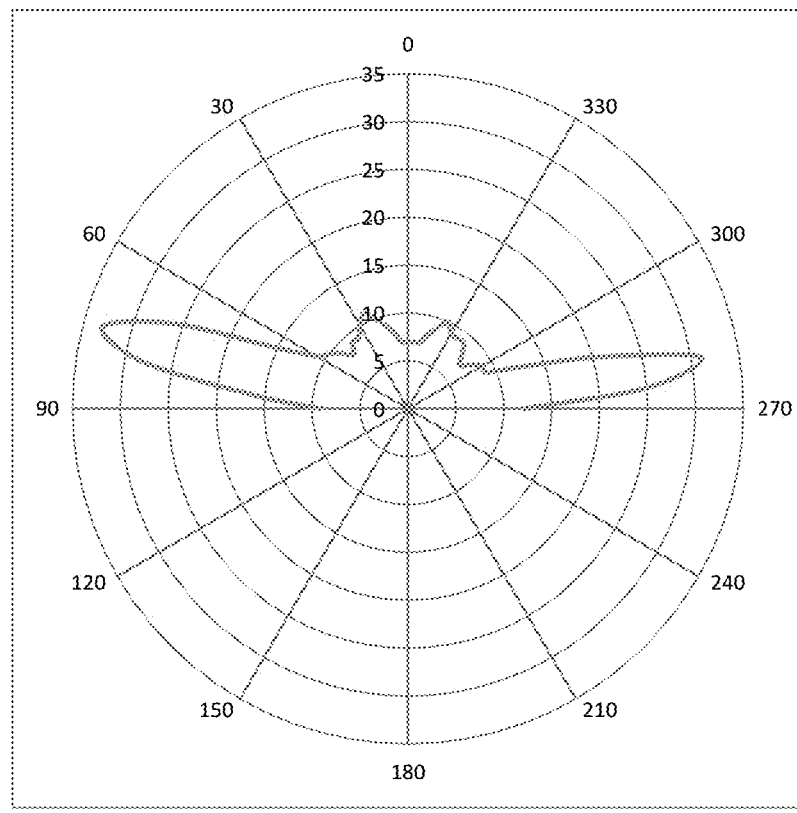
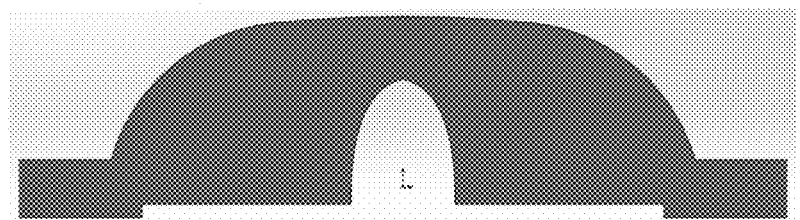
FIG. 26

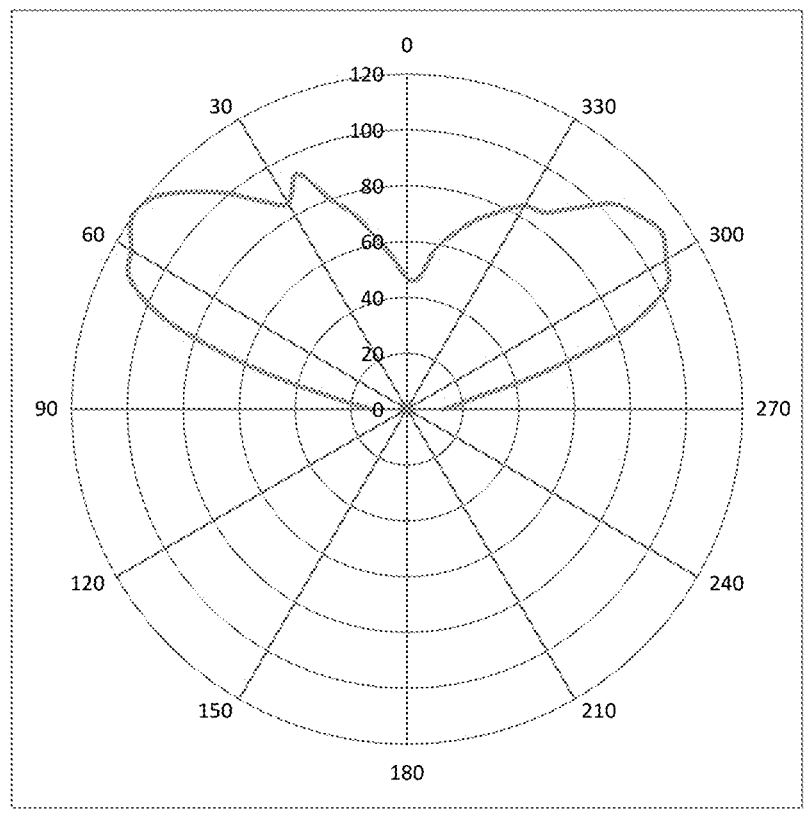
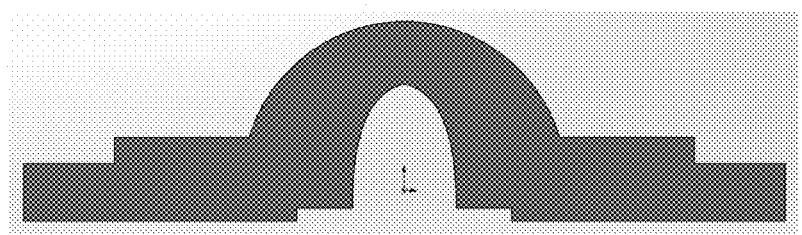
FIG. 27

LIGHTING ARRANGEMENT WITH OPTICAL COMPOSITE FOR TARGETED ILLUMINATION PATTERNS

RELATED APPLICATIONS

This application claims the benefit of U.S. provisional 62/837,534 titled "LIGHTING ASSEMBLY FOR UNIFORM ILLUMINATION PLANE" filed Apr. 23, 2019.

BACKGROUND

The present disclosure relates generally to lighting systems; more specifically, the present disclosure relates to an optical arrangement for providing light distribution patterns in an environment, for example uniform light distribution patterns in an environment. Furthermore, the present disclosure relates to a lighting assembly employing the optical arrangement for providing light distribution patterns in an environment, for example for providing uniform light distribution patterns in an environment. By "uniform" is meant angularly constant within a variation limit of +/−15% from a nominal value, more optionally within a variation limit of +/−10% from the nominal value.

Generally, lighting devices are utilized in many diverse applications, such as in office workspaces, in warehouses, in educational institutions, in research laboratories, in indoor and outdoor living spaces, in industrial areas, in vehicles and so forth to provide illumination for humans performing visual tasks. Additionally, nowadays, lighting devices are also employed for aesthetic purposes in order to provide a visually comforting environment to a given person. Conventionally, lighting systems are affixed in ceilings, walls and other geometric installations to illuminate an area associated therewith.

However, there are several problems associated with the aforementioned conventional lighting devices. One major technical problem of the conventional lighting devices is that they use high-intensity discharge lamps for illumination, for example high-pressure Sodium lamps, and they are often fixed at a given position within or in a vicinity of the regions that require lighting thereby. Such lighting systems emit light radiation in a fixed lighting direction. Furthermore, these lighting systems emit a non-uniform angular distribution of light in the associated region which potentially leads to visual discomfort for users. For example, such lighting sources are susceptible to create glare, when their emitted light radiation is incident of on other surfaces and reflected therefrom.

To overcome this aforesaid problem, generally, an environment or workspace is provided with multiple small lighting devices; employing multiple devices leads to an increase in installation and maintenance costs, inefficient energy usage, wastage of resources and environmental pollution. Furthermore, one or more optical elements employed in the conventional lighting devices receives light from a light source having particular characteristics defined by the properties of the light source and then alter the light propagating through the optical element. However, none of these optical elements is capable of improving the optical qualities of the light in a manner which evens out or smoothens out the light by eliminating high-intensity spots and low-intensity spots, color banding, glare and so forth. Furthermore, the one or more optical elements employed in the conventional lighting devices do not provide a continuous diffusion of light into an environment, thereby resulting in a non-discontinuous light diffusion. Additionally, none of these types of optical elements are capable of substantially reducing or eliminating scattering of light, and of directing substantially all, or most of, light in a particular desired direction, pattern, or envelope.

Therefore, taking aforementioned problems into consideration, there exists a need to overcome the aforementioned drawbacks associated with the existing lighting devices and the existing optical elements associated therewith.

Within the fields of optics and optical design there are established relations between intensity I of a light source and illumance E upon an illuminated surface. These relations are dependent on trigonometric relations of distance and incident angle and can be expresses in mathematical formulas as follows:

The inverse-square law, $E=I/d^2$, states that illuminance E is inversely proportional to the square of distance where d is distance.

The cosine law, $E=(I \cos \theta)/d^2$, relates illuminance to the incident angle $\theta$ of light.

The cosine-cubed law, $E=(I \cos^3\theta)/h^2$, further relates illuminance over an illumination plane to the perpendicular distance h from the light source to the illumination plane and the incident angle $\theta$ which references the perpendicular orientation.

SUMMARY

The present disclosure seeks to provide an optical arrangement that provides, when in operation, more uniform angular light distribution emissions into an environment. Furthermore, the present disclosure seeks to provide a lighting assembly employing the optical arrangement to provide, when in operation, more uniform angular light distribution emissions into an environment. The present disclosure seeks to provide a solution to a problem of non-uniform angular distribution of light leading to visual discomfort, spatial discontinuity in output light distribution, and non-availability of optical arrangements that enhance optical properties of light emissions and smooth the light emissions. Furthermore, the present disclosure seeks to provide a solution to a problem of, for example, wastage of electrical energy due to improper lighting emissions into an environment. An aim of the present disclosure is to provide a solution that overcomes, at least partially, the problems encountered in prior art, and that provides a compact, durable, robust, and aesthetically appealing optical arrangement and lighting assembly that is capable of enhancing the optical properties of light and thereby, providing different uniform angular light distributions. Additional Embodiments of the present disclosure substantially eliminate, or at least partially address, the aforementioned problems in the prior art, and provide an improved lighting assembly to provide more uniform light distribution patterns that mitigate visual discomfort and are aesthetically appealing to a given viewer. The present disclosure further, at least partially, eliminates wastage of light energy and improves energy efficiency.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF FIGURES

The preceding summary, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 15 is a table listing configuration details and optical measurement results of a group of optical arrangement embodiments and reference arrangement with order ranked by efficacy.

FIG. 20-28 illustrate embodiment polar plot light distributions achieved with a corresponding different optical element geometry in each figure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In overview, embodiments of the present disclosure are concerned with an optical arrangement for providing uniform light distribution patterns in an environment. Furthermore, the embodiments of the present disclosure also provide a lighting assembly employing the optical arrangement for providing uniform light distribution patterns in an environment.

Figure 1A:
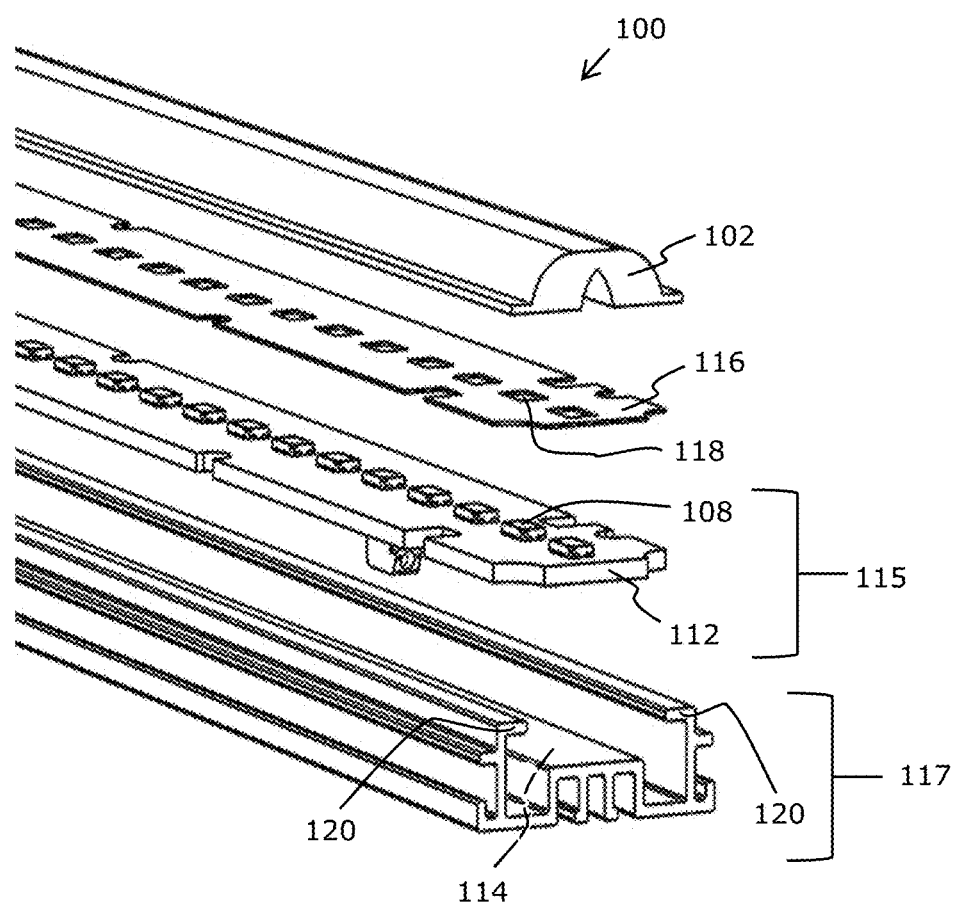
FIG. 1A is an exploded-view illustration of component parts of an optical arrangement, in accordance with various embodiments of the present disclosure.

Referring to FIG. 1A, there is shown an exploded-view illustration of an optical arrangement indicated generally by 100. The optical arrangement 100 includes one or more second portions 106, wherein the one or more second portions 106 are optically light-transmissive and light-refractive when in operation. Moreover, the optical arrangement 100 includes a series of light sources 108 supported on an light source board 112, wherein a reflective layer 116 in the form of an elongate stencil layer includes a series of apertures 118 and is interposed between the optical element 102 and the light source board 112, and wherein the light sources 108 are aligned with their corresponding apertures 118. The optical arrangement 100 further includes a housing 117 which holds and partially encloses the optical arrangement. The housing 117 in this embodiment includes a base support 114 for receiving the light source board 112, the reflective layer 116 and peripheral lateral edges of the one or more optical element second portions 106 that are retained within inward-facing lips 120 of the housing 117. Optionally, the base-support 114 is fabricated from extruded aluminium, the one or more second portions 106 are fabricated from optically transmissive polymer material such as extruded PMMA (acrylic). In this embodiment the reflective layer 116 is a stencil comprising high reflectance material. The reflectance can alternatively be any combination of diffuse or specular reflectance properties. In many applications, diffuse reflectance is useful in contributing to more uniform light distributions with smoother intensity change. In other embodiments the reflective layer can be configured as a coating on the surface of the light source board 112. Alternatively, the reflective layer can be optically coupled to the opposing face 107 of the optical element wherein there is at no air gap between the reflective layer and the opposing face. This removes internal reflection from the opposing face of the optical element and replaces with reflection directly from the reflective surface.

Figure 1B:
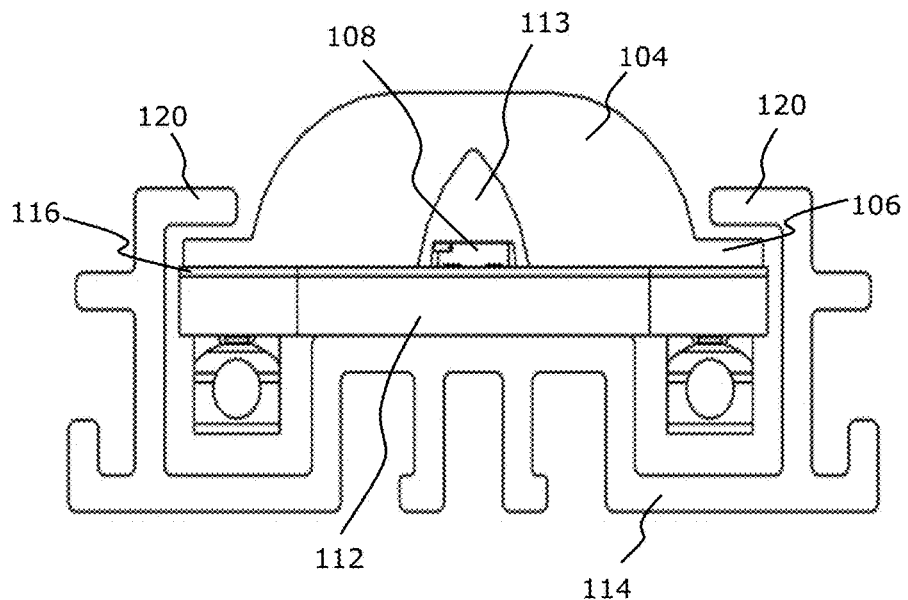
FIG. 1B is a cross-section illustration of the optical arrangement of FIG. 1A.

Referring next to FIG. 1B, there is shown a cross-sectional illustration of the optical arrangement 100 of FIG. 1A, when in an assembled state, wherein retention of peripheral edges of the one or more second portions 106 within the inward-facing lips 120 is shown. Beneficially, the base support 114 serves as a heatsink for dissipating heat energy generated in operation from the light sources 108. The light sources 108 emit optical radiation that propagates through the optical cavity 113, wherein the optical radiation is transmitted and refracted when propagating though the optical element first portion 104 and the one or more optical element second portions. In this particular embodiment, the second portions 106 are relatively small in size and function primarily as a means of securing the optical arrangement in place. In other embodiments the size of second portions are larger and have a more significant contribution to optical output.

Figure 1C:
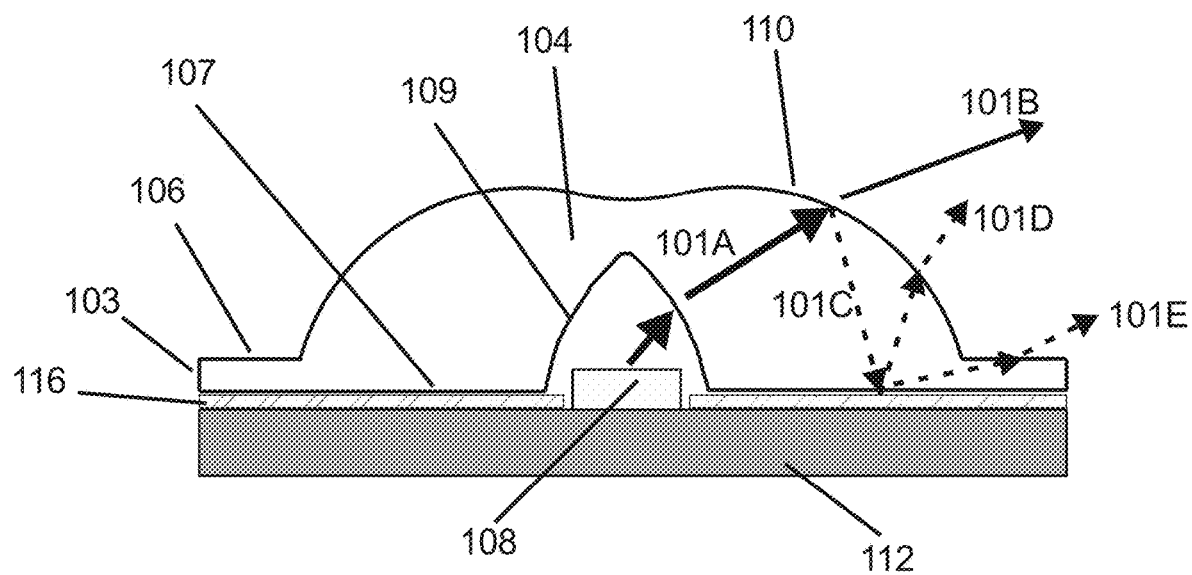
FIG. 1C is a schematic illustration of an optical arrangement, in accordance with various embodiments of the present disclosure.

Referring to FIGS. 1A-1C, there are illustrated alternative schematic representations of an optical arrangement 100, in accordance with various embodiments of the present disclosure. As shown in FIG. 1A, the optical arrangement 100 comprises an optical element 102. Throughout the present disclosure, a term "optical element" as used herein relates to elements that, when placed in a beam or path of light, change characteristics of the light passing through the optical element 102. It will be appreciated that the characteristics of light such as wavelength, intensity, dispersion angle, beam angle, beam width may be varied in accordance with one or more properties of the optical element 102 arranged in the path of the light. Notably, the light incident on the optical element 102 is further guided by any of the known optical phenomena such as refraction, reflection, and/or diffraction. The optical elements 102 include, but are not limited to, a collimating lens, a refractive lens, a light guide, a diffuser and a reflector. It will be appreciated that the characteristics of the light that is output from the optical element 102 depends on one or more of the types of the optical element 102 employed, a distance of the optical element 102 from the light sources, inherent properties of the optical element 102 such as its refractive index and so forth. A design and type of optical element 102, employed for a particular optical arrangement 100, is optimized accordingly to ensure generation of concentrated light beams emitted from the optical arrangement 100 when in operation, wherein the concentrated light beams having a substantially uniform intensity distribution, eliminating banding of the emitted light, leading to effective utilization of the emitted light from the optical arrangement 100. Furthermore, the optical element 102 as disclosed herein also ensures generation of a desired light distribution pattern, and reduction of (for example, minimizing) visual discomfort arising due to improper illumination and non-uniform light distribution as encountered in conventional optical arrangements.

Figure 5:
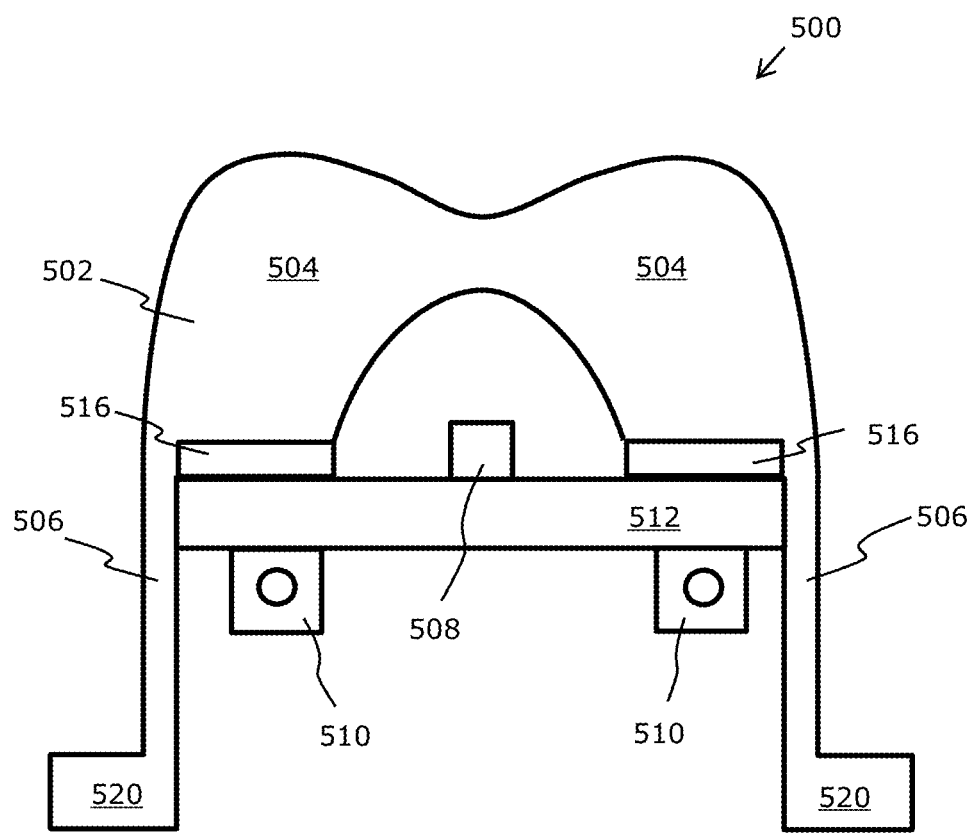
FIG. 5 is a cross-section illustration of an optical arrangement, in accordance with an embodiment of the present disclosure wherein the second portions of the optical element are extending in a direction perpendicular to the light source board.

As shown, the optical element 102 comprises a first portion 104, one or more second portions 106, and a light source 108. The first portion 104 has an input face 109 and an output face 110 (clearly shown in FIG. 1C) and is shaped to provide an internal cavity 113. The internal cavity 113 is, for example, understood to be a recess formed in the first portion 104 of the optical element to accommodate one or more light sources 108. Typically, the first portion output face 110 of the optical element first portion 104 has at least one curvature. By "curvature" is meant that the first portion output face 110 has a geometric arc when viewed in cross-section. In an example, the first portion 104 is a semi-cylindrical hollow structure having a elongate length and an annular thickness. The annular thickness is a radial dimension of the first portion 104 measured from the input face 109 to the output face 110. Notably, the first portion 104 is shaped as a semi-cylindrical hollow structure to provide the internal cavity 110. It will be appreciated that the shape of first portion 104 is not limited to a semi-cylindrical hollow structure as shown. The different shapes (in cross-section) of the first portion 104 include, but are not limited to, triangular (as shown in FIG. 5), cuboidal, elliptical, paraboloidal, or any other desired abstract shape having the input face 109 and the output face 110, shaped to provide an internal cavity 113.

Referring next to FIG. 1C, there is shown a cross-section view of the optical arrangement of the embodiment without the housing structure. The optical arrangement comprises the optical element 102 having the first portion 104 having the input face 109 and the output face 110, the one or more second portions 106 and the light source 108. The light source 108 is a LED mounted on an light source board 112 with a reflective layer 116 positioned between the optical element and the LED board is arranged inside the internal cavity 113 to emit light, such that light emitted from the light source 108 enters the first portion 104 illustrated by an example light ray 101A that propagates to the first portion output surface 110. Light ray 101B illustrates and example of a light ray subsequently transmitted through the first portion output surface 110 while light ray 101C illustrates an example of internal reflection wherein the light ray is subsequently reflected from the reflective layer 116 and light ray 101D transmits out the optical element first portion 104 while light ray 101E transmits out the optical element secondary portion 106. The blending of light output from the first portion surface 110, such as light ray 101B, with light output from the reflective layer 116, such as light ray 101D, and in some embodiments 101E, is an effective way to improve visual appearance of the light distribution pattern by reducing non-uniformity defects such as bright spots, dark spots, banding effects, and color separation. Addition of diffuse reflectance in many cases is particularly useful.

The light source board 112 is a circuit board that beneficially serves as a support platform for the light source 108. In an example, the light source board 112 beneficially provides mechanical support to the light source 108, as well as provides electrical functionality to the light source 108. Throughout the present disclosure, the term "light source" as used herein refers to any electrical device capable of receiving an electrical signal and producing electromagnetic radiation or light in response to the signal. The light sources 108 are optionally configured to generate electromagnetic radiation within the visible spectrum, outside the visible spectrum, or a combination of both. The term "light" is used when the electromagnetic radiation is within the visible ranges of frequency and the term "radiation" is used when the electromagnetic radiation is outside the visible ranges of frequency. Notably, the light sources 108 may be configured for a variety of applications, including, but not limited to, indication, display, and/or illumination. Generally, the light sources 108 are particularly configured to generate light having a sufficient intensity to illuminate effectively an interior or exterior environment or targeted area. In this context, "sufficient intensity" refers to a sufficient radiant power in the visible spectrum generated in the space or environment. The unit "lumens" is often employed to represent the total light output from the light source 108 in all directions, in terms of radiant power or luminous flux. The light sources 108 optionally use lights of any one or more of a variety of radiating sources, including, but not limited to, Light Emitting Diode LED-based sources (including one or more LEDs), electroluminescent strips, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources such as, photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The light source board 112 optionally includes one or more threaded holes, through-holes, and/or locating features. The printed circuit board 112 beneficially has any suitable shape, such as a round shape, a square shape, a rectangular shape, a hexagonal shape, and so forth. Herein, the printed circuit board is rectangular in shape, as an example. Optionally, light source 108 comprises two or more light emitting diodes (LEDs) arranged at one or more levels with respect to each other inside the internal cavity, to provide different light distribution patterns via transmission and refraction occurring in the optical element 102. For example, the support platform optionally also includes the mechanical and electrical connections required to elevate the LEDs 108 to a suitable distance above the actual printed circuit board plane. The LED array is optionally arranged in a rectangular pattern, or any other suitable pattern. Furthermore, each of the LEDs 108 that is arranged on the printed circuit board 112 is circumscribed by an encapsulating lens. In general, light emitted from a typical LED module has a Lambertian distribution pattern. A Lambertian distribution pattern has a peak that is oriented normal to the emitting surface (namely, the plane of the LEDs), often denoted as 0 degrees, with an angular fall-off of cos θ, where θ is an angle with respect to the surface normal. In an example, the LED module with the LED light source 108 and the optical element 102 are fixed to each other by gluing, soldering, welding, screwing, snapping, or any other suitable attachment method.

In all embodiments the optical element is composed of a light transmissive material. Optionally, the light transmissive material is a polymer or glass (for example, Silicon Dioxide), crystalline materials, polymers or plastics materials having a suitable refractive index in accordance with one or more desired light distribution patterns. In an example, the light transmissive material includes, but is not limited to, Polymethyl methacrylate (PMMA), polycarbonate (PC), silicone, polyethylene terephthalate (PET), Polyethylene naphthalate (PEN), and cyclic olefin copolymer (COC). In some embodiments the light transmissive material is clear and of homogeneous composition. In other embodiments, light transmissive material has a degree of light scattering properties which contribute to a more uniform light distribution pattern, in particular, smoothing out "hot spots", "banding", "color dispersion", "beam artifacts" and other irregularities in light distribution which are visibly noticeable to the human eye when projected onto a surface, for example, an wall, ceiling, or floor. Light scattering properties can be introduced to an optical element by imparting surface features or texture to a surface, or stated another way, by removing a gloss surface. Alternatively or in combination with surface modification, the volume of the optical element can be given light scattering properties by inclusion of regions of differing refractive index dispersed throughout the volume. For example, one or more particle types having refractive index different than the bulk material can be dispersed within the volume. Alternatively, second phase regions of differing refractive index can be formed by fluid phase mixing of immiscible materials during processing. In addition to refractive index difference of dispersed material vs. bulk material, the quantity per volume, size, and shape of dispersed regions can be adjusted to effect light scattering properties. In the case of immiscible blends formed by fluid phase mixing, the shape of one or more regions are optionally other than spherical, for example oblate paraboloid, thereby generating non-symmetric light scattering. It will be appreciated that the concentration of dispersed regions of differing refractive index is an important variable in effecting light scattering properties that influence angular light distribution and uniformity of beam pattern.

Optionally, the first portion 104 functions as a lens structure, the lens structure being one of a convex lens, a concave lens and a Fresnel-type flat lens. Notably, the term "lens structure" as used herein refers to an optically transmissive structure that is configured to focus or disperse light according to a defined light distribution pattern. Herein, the light enters from the input face 109 of the lens structure and exits from the output face 110 of the lens structure. In an example, when the first portion 104 functions as a concave lens, the first portion 104 is designed to be thinner at the center and thicker at the edges. It will be appreciated that the concave lenses are diverging lenses, and therefore when the light emitted from the light source 108 enters the concave lens, the light beam is refracted and diverged from the output face 110 to provide a wide-angle or a broad beam width spreading the light into the environment. In another example, when the first portion 104 functions as a convex lens, the first portion 104 is designed to be thicker at the center thereof and thinner at edges thereof. It will be appreciated that the convex lenses are converging lenses, and therefore when the light emitted from the light source enters the convex lens, the light beam is refracted and converged from the output face 110 to provide a collimated beam, such as the one used in spot lights. In another example, the first portion 104 may be as simple as a conventional cylindrical lens where a beam of light entering the lens remains unaffected in its width and is spread by the cylindrical lens contour in a direction perpendicular to its width. Another example of the first portion 104 of the optical element 102 is a transparent medium having a flat surface on one side and a concave or convex surface on the other side which changes the characteristics of light passing through the lens providing a desired light distribution pattern; for example, the optical element 102 is fabricated from a optically-refractive material have a spatially-varying refractive index.

In another example, the lens structure is a Fresnel-type flat lens. Herein, the first portion 104 is designed to have a Fresnel-type flat lens consisting of a flat surface with interspaced, concentric steps, wherein each step corresponds to a surface of a conventional lens. It will be appreciated that each step acts as a refractive surface like a prism. Notably, Fresnel lenses are thinner as compared to conventional lenses, and produce and extremely collimated light beam without distorting light out of the light beam. Optionally, a Fresnel lens includes a plurality of Fresnel structures provided on a surface of the lens which bend or refract the light in order to collimate or focus the light passing through the lens. Such structures are capable of directing substantially all of the light emitted from the light source 108 in a particular direction and in a particular shape, envelope, or pattern. One or more other type of lens structures optionally include, but are not limited to, (diffraction) grating structures, filters, total internal reflection (TIR) structures, non-linear optical elements such as GRIN lenses, prismatic structures, polarizers, pillow optic formations, optical fiber waveguides and other types of optical waveguides.

Optionally, the first material in the first portion 104 is distributed such that the provided lens structure has sections with varying focal points. The first portion 104 optionally comprises a plurality of sections having mutually different refractive indices. When the light emitted from the light source 108 enters the mutually different sections, the light is refracted and collimated to respective focal points in accordance with the refractive indices of respective sections of the optical element. In an example, the first portion 104 is divided into 5 sections of varying focal lengths namely, F1, F2, F3, F4 and F5. When the light from the light source 108 is incident on the first section having focal length F1, the light beam emanating from the output face 110 sharply illuminates a first area on a floor, wall or ceiling associated therewith. When the light from the light source 108 is incident on the second section having focal length F2, the light beam emanating from the output face 110 sharply illuminates a second area on a floor, wall or ceiling associated therewith. When the light from the light source 108 is incident on the second section having focal length F3, the light beam emanating from the output face 110 sharply illuminates a third area on a floor, wall or ceiling associated therewith. When the light from the light source 108 is incident on the fourth section having focal length F4, the light beam emanating from the output face 110 sharply illuminates a fourth area on a floor, wall or ceiling associated therewith. Similarly, when the light from the light source 108 is incident on the fifth section having focal length F5, the light beam emanating from the output face 110 sharply illuminates a fifth area on a floor, wall or ceiling associated therewith. It will be appreciated that each of the sections of the lens are susceptible to being utilized simultaneously, or only one section, or a combination of one or more sections are susceptible to being utilized by one or more light source 108 to provide a more uniform light distribution pattern, as well as define an illumination area as and when required.

As shown, the optical element 102 comprises one or more second portions 106 extending from the first portion 104. Each of the one or more second portions 106 extend from each of lateral ends of the first portion 104. It will be appreciated that one or more second portions 106 are flanges extending from diametric ends of the first portion 104. Notably, each of the one or more second portions 115 are substantially cuboidal in shape, having a longitudinal length same as a length of the first portion 104, and a thickness same as an annular thickness of the first portion 104. Furthermore, each of the second portions 106 is substantially parallel to the light source 108. It will be appreciated that the optical element 102, together with the first portion 104 and the second portion 106 are provided as a monolithic structure. Optionally, the second portion 106 is composed of a second material that is different from the first material. The second material optionally has a refractive index that is different to a refractive index of the first material. The one or more second portions 106 function as a light-guide, causing total internal reflection of the emitted light from the light source 108 received therein, thereby to redirect the emitted light. A primary purpose of the one or more second portions 106 is to redirect light that enters into the one or more second portions 106. Notably, the light rays undergo total internal reflection without being significantly absorbed or transmitted (for example, less than 10% absorbed therein). It will be appreciated that the total internal reflection occurs when a ray of light strikes an interface between two regions have mutually different refractive indices, at an angle greater than a critical angle of the interface, wherein the critical angle is defined by the mutually different refractive indices. Alternatively described, the critical angle is the angle at which the refracted ray exits the interface parallel to the interface itself, or with a propagation angle of 90 degrees with respect to the surface normal. In an example, if the second portion has a particular refractive index, say "n", the critical angle inside the second portion 106 at the second portion 106 and air interface is given by $\sin^{-1}(1/n)$. Therefore, the one or more second portions 115 are designed so that if a light ray leaves the LED light source 108 and strikes any of the one or more second portions 106, it does so at an angle greater than the critical angle. Optionally, the one or more second portions 106 may serve as flanges that connect the optical element to the LED module.

Figure 2A:
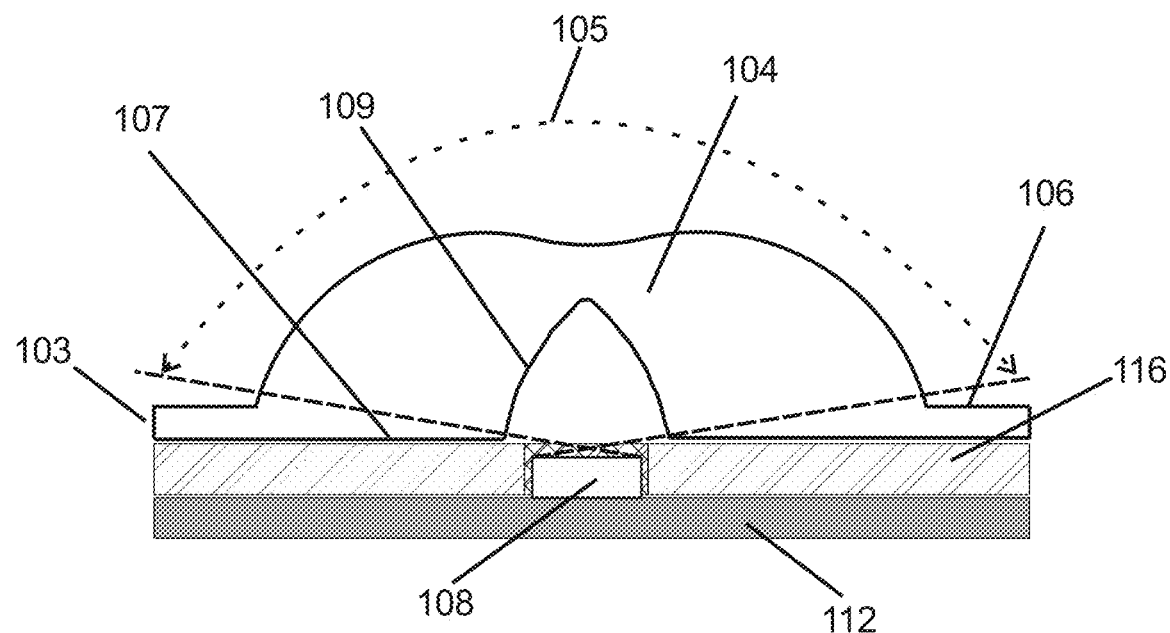
FIG. 2A is a cross-section illustration of an optical arrangement embodiment where the light source is recessed within a reflective layer.

FIG. 2A is a cross-section illustration of an optical arrangement embodiment wherein the light source 108 is recessed within a reflective layer 116 and the opening in the reflective layer functions as an aperture and constrains the angular input angle 105 of the light source projecting into the optical element so that light is only projected into the first portion 104 of the optical element and light is not directly projected into the second portions 106 of the optical element. This diminishes the transmission of light out the second portions 106 in, and out the edge face 103 in particular. Additional numbered features in FIG. 2A function similarly as described in FIG. 1C; light source board 112, first portion 104 of the optical element, opposing face 107 of the optical element, and input face 109 of the optical element.

The optical arrangement as illustrated in FIG. 2A converts the typically Lambertian intensity distribution of a light source into a uniform intensity distribution pattern, such as, a batwing configuration. One known approach to achieve a uniform illumination of a surface area is to use a so-called "batwing intensity distribution" (also referred to as "a wide beam intensity distribution"). The term "batwing" refers to a highly dual peaked shape of the intensity distribution in a polar plot.

Figure 2B:
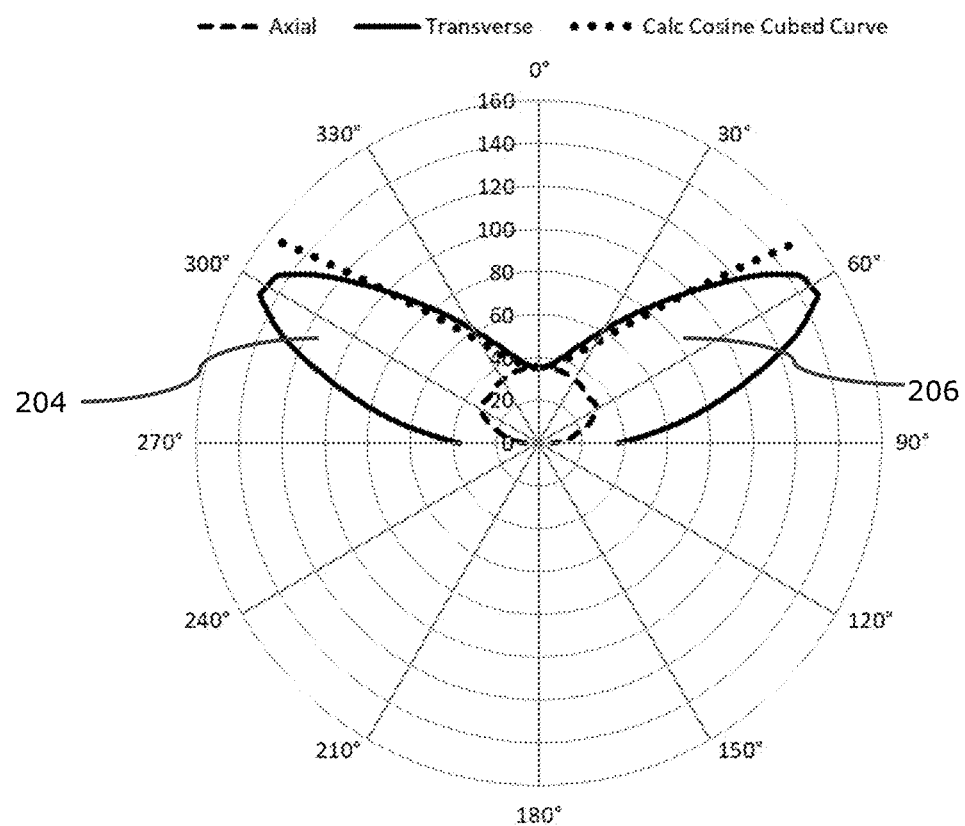
FIG. 2B is a schematic illustration of a batwing intensity distribution as a polar plot, in accordance with the embodiment of FIG. 2A.

In FIG. 2B, there is shown an example of a desired batwing intensity distribution as a polar plot in accordance with an embodiment of the present disclosure. Two wings 204 and 206 in this example polar plot have a peak intensity at 60 degrees each side of a normal angle, and an aim of such an implementation is to provide a uniform surface illumination of a target area such as a ceiling or a floor over an angular range. Per the known cosine-cubed law of illumination, there is required an intensity that is increasingly higher at higher angle because there is a target surface area having its center aligned perpendicular with the 0 degree orientation and illumination with angular variation from that alignment is proportional to $\cos^3 \theta$ where $\theta$ is the angular diversion from 0 degree. The optical design thus needs to change the Lambertian intensity distribution from a LED output intensity into the batwing distribution. It will be appreciated that the batwing intensity distribution allows for a uniform illumination of a planar surface. The polar plot of FIG. 2B plots both the actual light distribution of an embodiment optical arrangement and the theoretical calculated cosine-cubed curve. It can be seen that the two closely match up to an angle of about 45 degree from normal (0 degree). Such light distributions and hence lens designs are beneficially used, for example, in architectural lighting, in street lighting, in car parks and in wall washer applications. In these examples, the batwing intensity distribution targets a planar surface in a far field, with an illuminated surface positioned at a distance much larger than light module dimensions. The light distribution optionally however is also applicable for short range illumination.

Figure 2C:
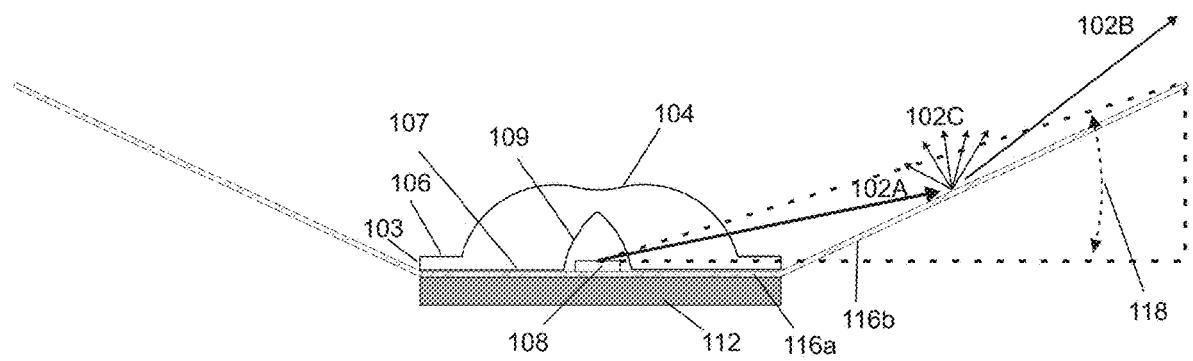
FIG. 2C is a schematic illustration of an optical arrangement embodiment wherein the reflector layer extends beyond the optical element and is angled to further reflect light and adjust the output light distribution.

FIG. 2C is a schematic illustration of an optical arrangement embodiment wherein the reflector layer extends beyond the optical element and is angled to further reflect light and adjust the output light distribution. The embodiment of FIG. 2C represent the same optical arrangement embodiment of FIG. 1C but with the addition of an supplemental reflector 116b that is positioned to redirect light from the supplemental reflector angular input range 118. Example light ray 102A is projected from the light source 108 through the optical element first portion 104 and intersects with the supplemental reflector 116b. From the supplemental reflector 116b, example light ray 102B is a specular reflection of light ray 102A and example light rays 102C illustrate light ray 102A being converted to diffuse reflection wherein rays are widely scattered. In many applications, diffuse reflectance from either a reflective layer 116a or supplemental reflector 116b can be useful in making illumination patterns more smooth and uniform which typically improves visual appearance. In FIG. 2C, the supplemental reflector is configured as an extension of the reflective layer 116a but in other embodiments the supplemental reflector could be a separate component or integrated into the housing.

Figure 2D:
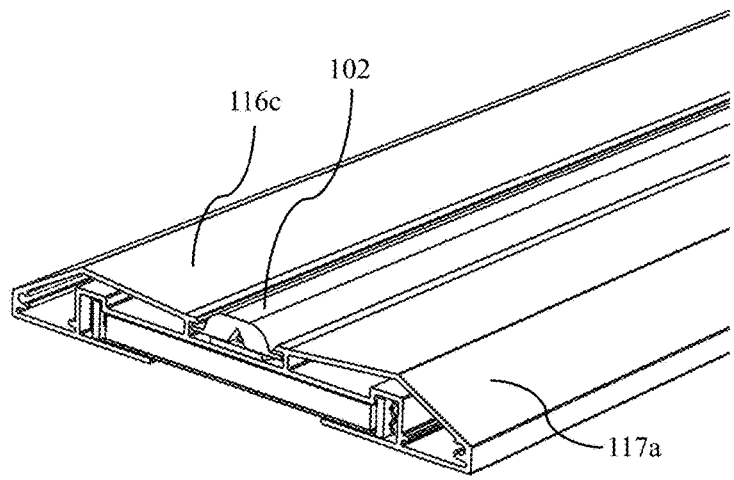
FIG. 2D is an isometric view of a light fixture wherein the housing forms a reflector that further controls the output of the optical arrangement.

FIG. 2D is an isometric view of a light fixture with end cap removed wherein the housing forms a reflector that further controls the output of the optical arrangement. The supplemental reflector 116c is a surface on the fixture housing 117a that holds and partially encloses the optical arrangement including the optical element 102.

Figure 3A:
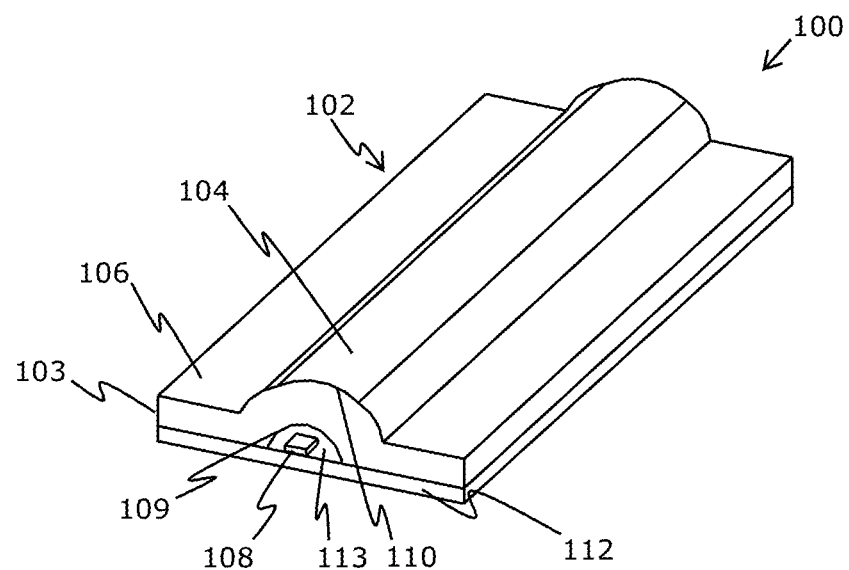
FIG. 3A is a schematic illustration of an optical arrangement comprising an optical element with extended secondary portions.

FIG. 3A is a schematic illustration of an optical arrangement comprising an optical element 102 with enlarged secondary portions 106 as compared to the first portion 104. The enlarged second portions are both wider and thicker than previously illustrated embodiments of FIGS. 1 & 2. The enlarged second portions enable more light to output from the second portions 106 and less light to emit from the first portion 104, a balance of light output that is advantageous in some applications. One effect is that the emitting area of the optical element is enlarged and with light output spread over the entire optical element, the visual brightness appearance of the optical element is reduced. This can be important in applications where the optical element is directly visible to the human eye. Specifically, the discomfort of glare can be reduced in illuminated spaces that are occupied by humans or other animals. Additional benefits in unique illumination patterns can also be achieved. For example, more light can optionally be directed to emit for the edge face 103 of the optical element.

Figure 3B:
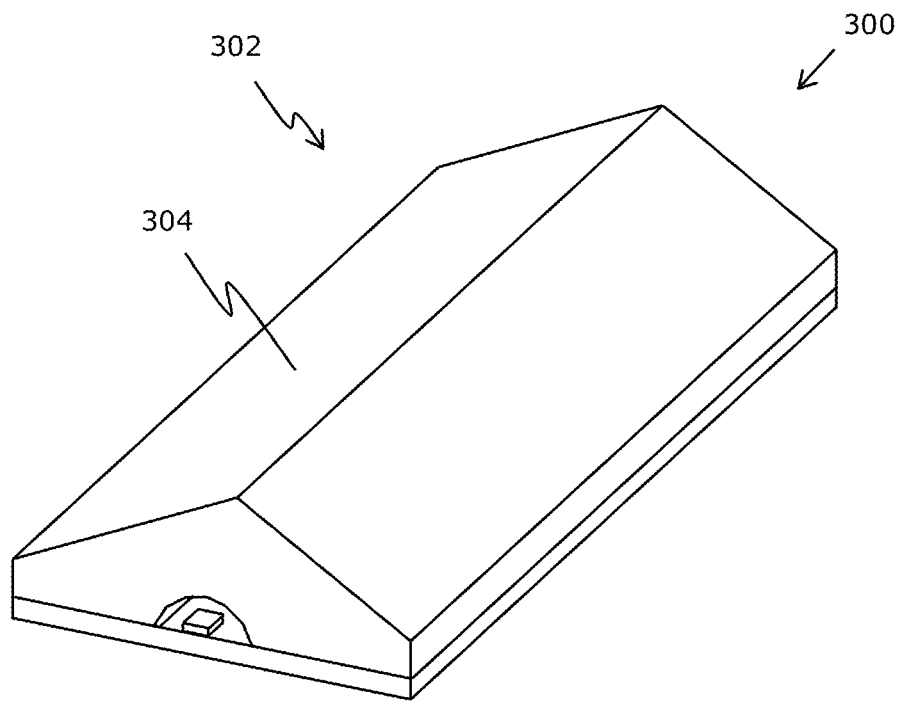
FIG. 3B is a schematic illustration of an optical arrangement comprising an optical element having a triangular cross-section, in accordance with an embodiment of the present disclosure.

Referring next to FIG. 3B, there is shown an illustration of an optical arrangement 300 comprising an optical element 302 having a substantially triangular cross-section, in accordance with an embodiment of the present disclosure. Such an optical arrangement 300 having a triangular optical element 302 ensures that a light output from an output face 304 has a uniform angular distribution. Beneficially, the output light rays are refracted in a manner such that the output rays are normal to the surface of the output face 304 of the optical element 302. Herein, optionally, a triangular lens employed is an isosceles triangle having an apex angle varying in a range of about 70 degrees to 120 degrees, thereby producing a high illuminance distribution having a wide angular output.

Figure 4A:
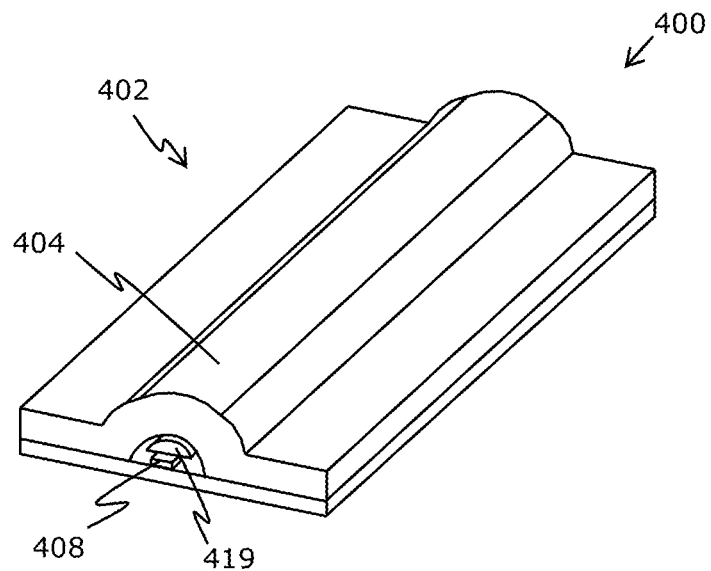
FIGS. 4A-4B are schematic illustrations of an optical arrangement embodiment having a supplemental lens positioned in the optical cavity.
Figure 4B:
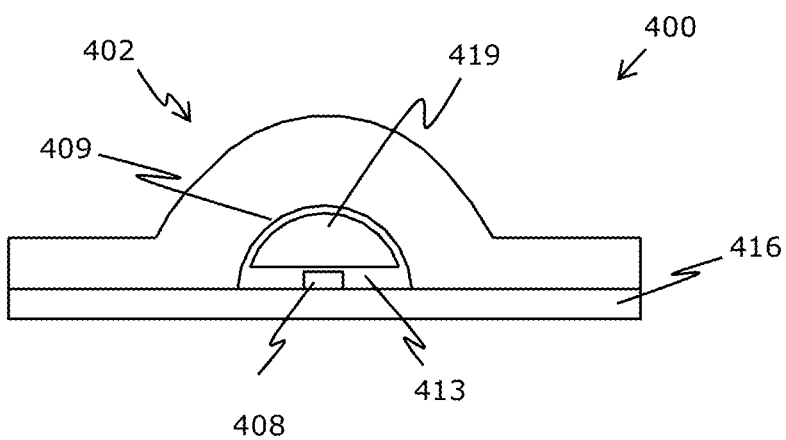

Referring next to FIG. 4A-4B, there are shown illustrations of an optical arrangement embodiment 400 wherein an additional supplemental lens 419 is positioned inside the internal cavity 410 between the light source 408 and input face 409 of the optical element 402. The supplemental lens 419, depending on specific configuration, functions to do one or more of the following; 1) redirect light in a focusing manner, 2) scatter light to redirect light within the optical element in order to a) adjust and optimize beam output distribution and/or uniformity, b) reduce glare by obscuring direct view and reducing peak brightness of the light source. Light scattering properties can be configured in the volume of the supplemental lens by the inclusion of second phase regions of differing refractive index as described in paragraph 0044. It will be appreciated that such an arrangement can provides an aesthetically appealing linear glowing strip within the optical element; i.e. a "virtual filament" generating a uniform light distribution pattern. In an example, a supplemental lens 402 operates to receive a plurality of light beams emitted from each of the light sources 408 such as LED sources arranged on the LED board and impart homogeneity to different light beams, thereby producing a more uniform light distribution pattern spread over a wide angle.

FIG. 5 is a cross-section illustration of an optical arrangement, in accordance with an embodiment of the present disclosure wherein the second portions of the optical element are extending in a direction perpendicular to the light source board.

Figure 13:
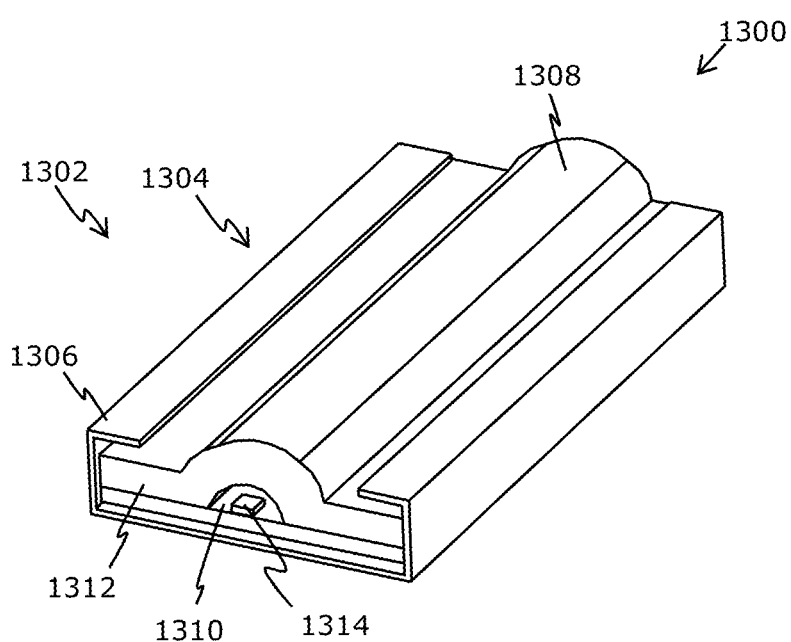
FIG. 13 is a schematic illustration of an exemplary lighting assembly, in accordance with an embodiment of the present disclosure.

Referring to FIG. 5, there is shown a cross-section view illustration of an exemplary implementation of an optical arrangement 500. The optical arrangement 500 includes a first portion 504 of the optical element, one or more second portions 506, one or more LEDs 508 mounted on an light source board 512 that functions as a supporting substrate. The one or more second portions 506 include leg regions 520 that engage with a housing (not shown), for example in a manner as illustrated in FIG. 13. Electrical connection arrangements 510 are included on the light source board 512, on the opposite side and remote from the one or more LEDs 108, as shown. There is also included a reflective layer 516 between the optical element 502 and the light source board 512 to provide improved light output control and efficiency of the optical arrangement 500. An advantage of this embodiment is that the second portions raise the first portion 504 of the optical element, along with the light source board 512, above the housing to reduce the amount of light trapped in the housing.

Figure 6A:
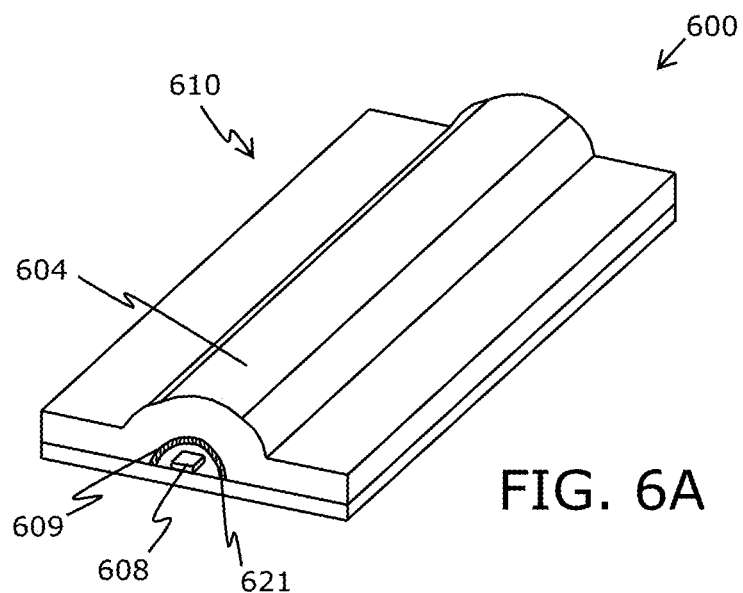
FIG. 6A and FIG. 6B, show an optical arrangement embodiment with a light scattering layer at the inner face of the optical element within the optical cavity.
Figure 6B:
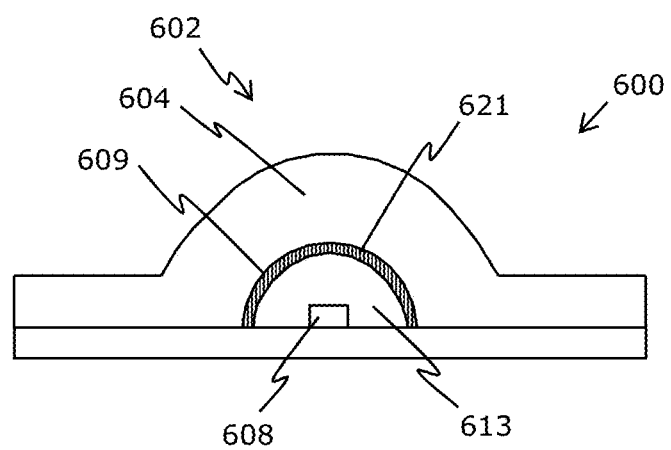

Referring next to FIG. 6A and FIG. 6B, there is shown an optical arrangement 600 comprising a light scattering layer 621 on an inner face 609 of a first portion 606 of the optical element 602 facing a light source 608, to modify light distribution of the optical arrangement and also decrease the observed peak brightness of the optical arrangement to reduce glare. The size and shape of the optical cavity 613 can be adjusted to optimize the light output and appearance of the optical arrangement. The light scattering layer 602 can be comprised of a combination of surface and/or volumetric features, with volumetric light scattering compositions described in paragraph 0044. The light scattering layer 621 can be alternatively formed by methods including but not limited to coextrusion along with the optical element or coating and curing by means of UV exposure, temperature, or humidity.

Figure 7:
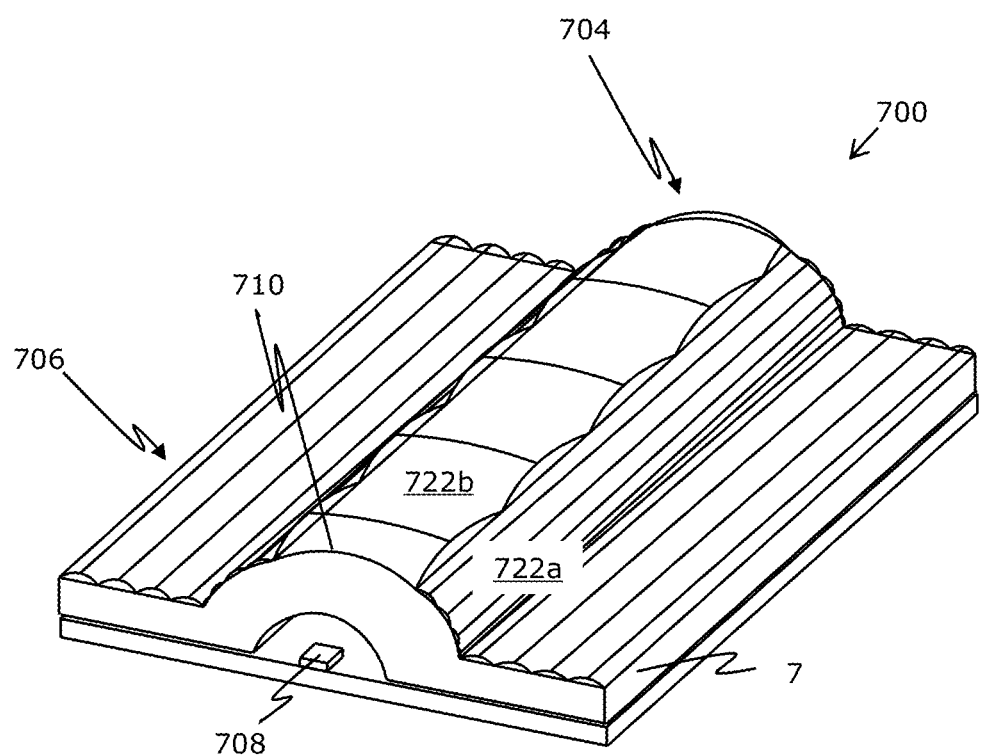
FIG. 7 is a schematic illustration of an optical element, further comprising surface features formed on an output face of a first portion thereof, in accordance with various embodiments of the present disclosure.

Referring to FIG. 7, there is shown an optical element 700 further comprising surface features 722 formed on a first portion output face 710 of a first portion 704 of the optical element to redirect light from the first portion 704 to an ambient environment, in accordance with an embodiment of the present disclosure. Throughout the present disclosure, the term "surface features" refers to an arrangement of optical features formed on the outer face of the first portion 704 and each of one or more second portions 706 to redirect light as incident on an inner face of the first portion and the one or more second portions 706 respectively, at different desired angular distributions by a way of refraction, diffusion, reflection, scattering and so forth. Optionally, the surface features 702 are arranged in a pattern. Herein, when light is output from such surface features 702, the surface features 702 produce a light output having an angular distribution with a more smooth, consistent and continuous intensity. It will be appreciated that the surface features 702 are configured to modify the direction of light emitted from a light source 708 so as to shape the light output into a desired light distribution pattern or envelope.

In the illustrated embodiment, the surface features 722 comprise a combination of a lenticular pattern 722a which orients in an axial direction and an embossed lenticular pattern 722b which orients in a transverse direction. Optionally, surface features vary in shape, size and also a spacing between two adjacent surface features varies. Optionally, the surface features comprise a full or partial geometric shape of one or more of a polygon, a truncated polygon, a concave polygon, a convex polygon, a sphere, an arc, a parabola, an ellipse, a paraboloid, an ellipsoid, a polyhedron, and a polyhedron frustum.

Figure 8A:
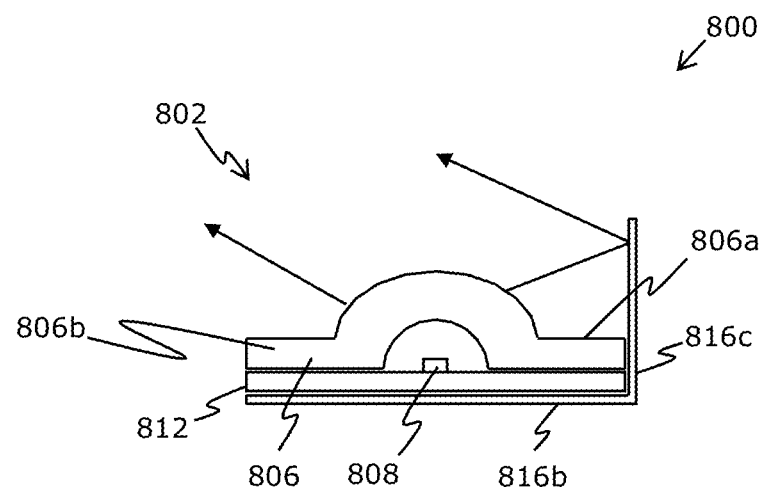
FIGS. 8A-8B are schematic illustrations of an optical arrangement comprising one or more reflectors, in accordance with different embodiments of the present disclosure.
Figure 8B:
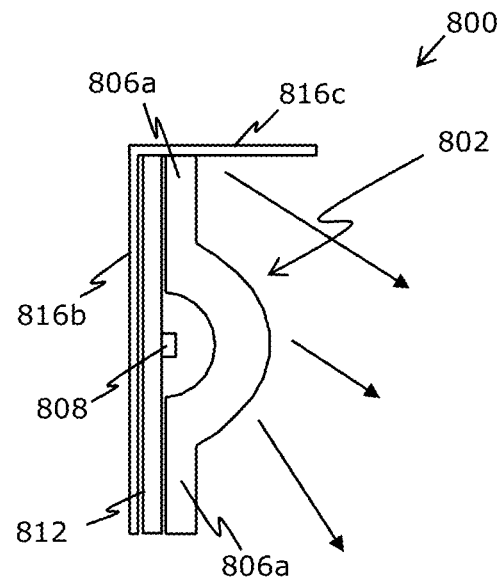

Referring to FIGS. 8A and 8B, there is shown illustrations of an optical arrangement 800 comprising one or more reflectors, in accordance with different embodiments of the present disclosure. As shown, the optical arrangement 800 comprises an optical element 802 (such as the optical element of FIG. 1), a light source 808 (such as the light source of FIG. 1), a reflective light source board 812 arranged underneath the light source 808 and one or more supplemental reflectors (depicted as reflectors 816b and 816c). Notably, the reflectors 816b and 816c are located along one or more of the reflective light source boards 806 and at least one of one or more second portions 806 of the optical element 802 to redirect emitted light further to provide a desired pattern of emitted light. It will be appreciated that the one or more reflectors 816b, 816c act as light redirecting planes that are employed to create a wall wash light distribution pattern and/or a cove light distribution pattern of the emitted light. Notably, such light distribution patterns are beneficial to employ where a more uniformly illuminated surface is desired, and a target plane orientation is not perpendicular from the optical arrangement 800. Moreover, the reflectors 816b, 816c located along one or more of the reflective light source boards 806 and at least one of the one or more second portions 806a, 806b of the optical element 802 redirects light to generate an asymmetric light distribution.

Throughout the present disclosure, the term, "reflector" used herein refers to a device for reflecting the light emitted from the light source 804 in a manner that the emitted light is redirected to provide a desired pattern. Examples of the reflector 816b, 816c include, but are not limited to, a piece of glass, a metal component, a mirror, and the like. Notably, the one or more reflectors 816b, 816c may have a reflecting surface of non-specular reflectance. The non-specular reflectance refers to a reflection of light from a surface in a manner that the light is reflected (namely, scattered) at many angles from the surface of the reflector 816b, 816b. In such a case, a luminous intensity of the reflected light appears to be uniform throughout the reflecting surface when viewed from different angles.

In an example, the optical arrangement 800 comprises a first reflector 816b and a second reflector 816b, wherein the first reflector 816b is located along the reflective light source board 812 and the second reflector 816c is located along a second portion 806a of the optical element 802. In another example, the optical arrangement 800 comprises a single reflector, wherein a shape of the single reflector is selected in a manner, like being "L"-shaped, such that the single reflector is located along the reflective light source board 812 and a second portion 806a of the optical element 802.

FIG. 8A and FIG. 8B are the same optical arrangement but mounted in different orientations so that the embodiment of FIG. 8A is well suited for wall grazing or cove lighting while the embodiment of FIG. 8B is well suited for a ceiling mounted wall washing application.

Figure 9:
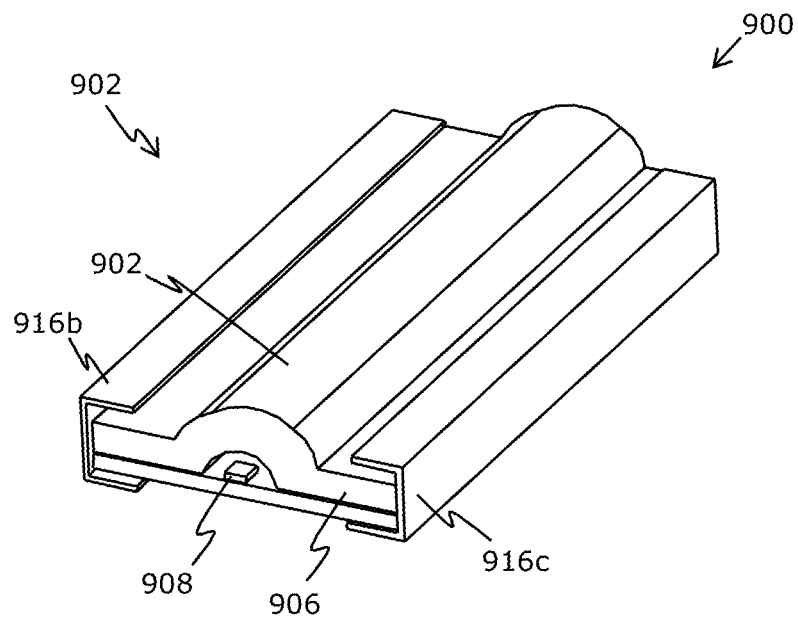
FIG. 9 is a schematic illustration of an optical arrangement, in accordance with an embodiment of the present disclosure.

Referring to FIG. 9, there is shown a schematic illustration of an optical arrangement 900, in accordance with an embodiment of the present disclosure. As shown, the optical arrangement 900 comprises an optical element 902 (such the optical element of FIG. 1), a light source 908 (such the light source of FIG. 1), and one or more reflectors 916b and 916c wrapped around one or more second portions 906 of the optical element 902. Notably, the one or more second portions 906 function as a light-guide, causing total internal reflection of the emitted light from the light source 908 received therein, to redirect the received light thereby, and the reflectors 916b and 916c redirect the received light back into the first portion of the optical element 902 in a manner that light is directed to the environment via an output face of the optical element 902.

Figure 10:
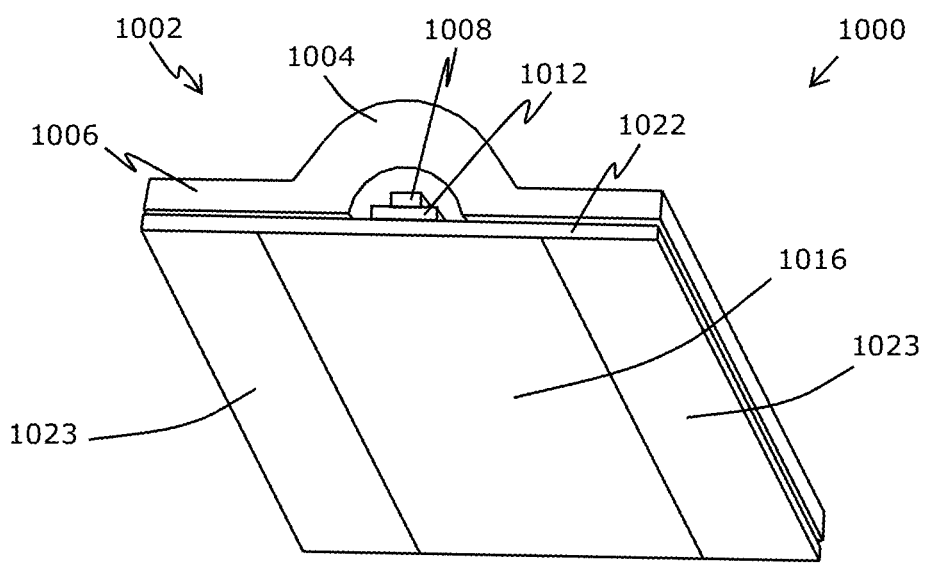
FIG. 10 is a schematic illustration of an optical arrangement comprising one or more reflective strips, in accordance with an embodiment of the present disclosure.

Referring next to FIG. 10, there is shown a schematic illustration of an optical arrangement 1000 comprising one or more reflective strips, in accordance with an embodiment of the present disclosure. As shown, the optical arrangement 1000 comprises an optical element 1002 (such the optical element of FIG. 1), a light source 1008 (such the light source of FIG. 1), a light transmissive opposing sheet 1022 arranged underneath the light source board 1012 and one or more reflective strips 1016 that are optically coupled to the opposing sheet 1006 to reflect light exiting from the opposing sheet 1006 back into the optical element 1002. Beneficially, the light exiting from the opposing sheet 1006 back into the optical element 1002 is reflected in a manner that an increased (for example, maximum) amount of light is spread in the ambient environment from an output face of the optical element 1002 to provide a desired illumination pattern. Light transmitting through the light transmitting surfaces 1023 of the light transmissive sheet create a direct-indirect light fixture with light projecting from both sides of the light transmissive opposing sheet 1022.

In further embodiments, the optical arrangement 1000 comprises multiple reflective patterns on the light transmissive opposing sheet which can be arranged to control direct-indirect light distribution as well as visual appearance and aesthetic perception. The light transmitting sheet can be configured with clear or light scattering properties as described in paragraph 0044.

Figure 11A:
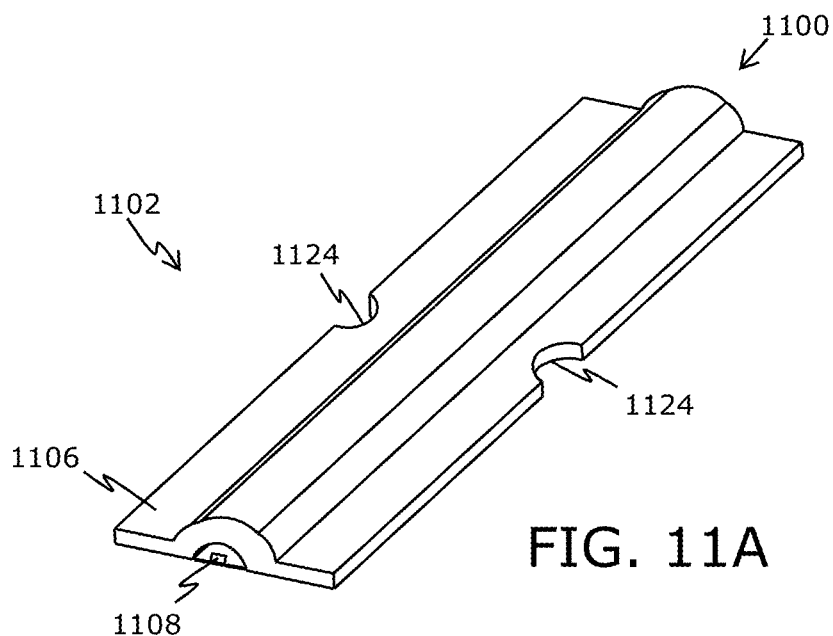
FIG. 11A-11B are schematic illustrations of an optical arrangement further comprising one or more slots and one or more mounting elements arranged therein, in accordance with various embodiment of the present disclosure.
Figure 11B:
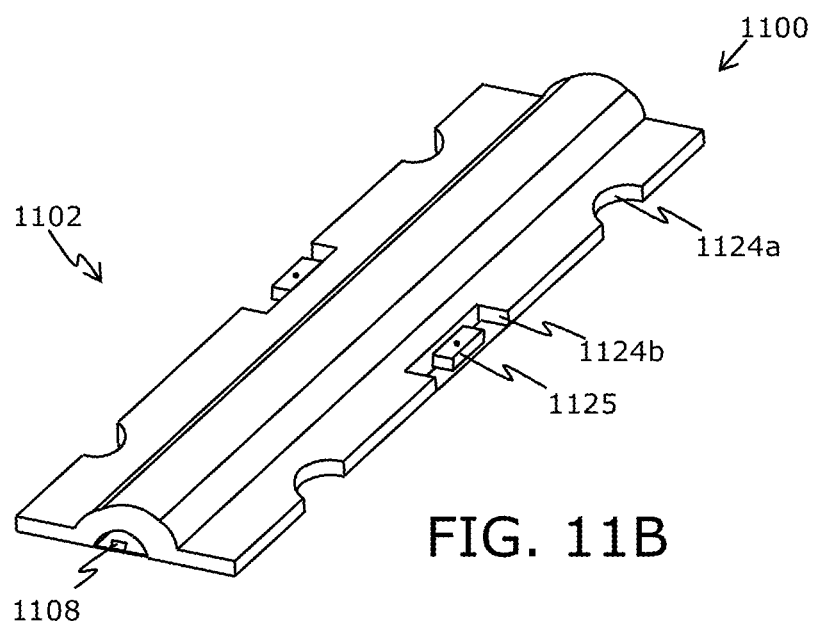

Referring next to FIGS. 11A-11B, there are shown schematic illustrations of an optical arrangement 1100, in accordance with various embodiment of the present disclosure. As shown, the optical arrangement 1100 comprises an optical element 1102 (such the optical element of FIG. 1) and a light source 1108 (such the light source of FIG. 1). Notably, one or more second portions 1106 comprise one or more slots 1124 formed therein to which one or more mounting rails 1125 are accessed. In the present examples, the one or more mounting rails 1125 are composed of a reflective material. Notably, the one or more mounting rails 1125 are composed of the reflective material, for example, such as a white reflective coating, a black reflective coating and the like. Beneficially, such a reflective material has a refractive index such that no obstruction is created in a light distribution or visual appearance exhibited, when in operation, by the lighting assembly.

As shown, particularly in FIG. 11B, the one or more mounting rails 1125 are positioned within the one or more slots 1124a or 1124b in a manner that a supporting structure is provided to the optical arrangement 1100. In an example, the one or more second portions 1106 of the optical element 1102 comprises a single slot 1124 on each of the one or more second portions 1106 along the length of the optical element 1102, or alternatively the one or more second portions 1106 of the optical element 1102 comprise a plurality of slots 1124a and 1124b on each of the one or more second portions 1106, depending on the requirement for supporting the one or more mounting rails 1110.

Optionally, the one or more mounting rails 1125 provide a supporting structure to the optical arrangement 1100 in a manner that a suspended ceiling system is formed. In such a case, the suspended ceiling system is supported by hanging wires extending from the one or more mounting rails 1125 at a height to provide a gap between a structural ceiling of architecture, such as a room of a house, or a building and the suspended ceiling system.

Optionally, the one or more slots 1124a or 1124b formed within the one or more second portions 1106 provide a space within which a controller is accessible. Such a controller is optionally employed to control operation (namely, functioning) of the optical arrangement 1100 and control the light source 1104 in a manner that desired lighting arrangement can be achieved.

Figure 12:
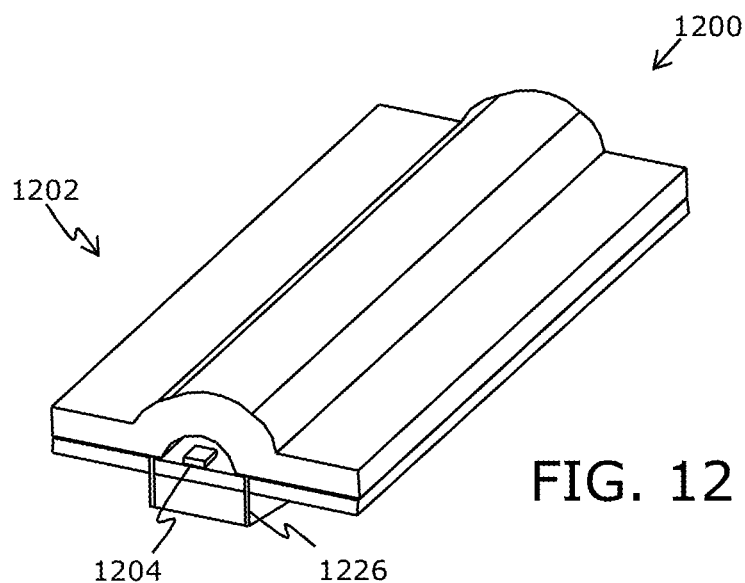
FIG. 12 is a schematic illustration of optical arrangement comprising an internal support rail, in accordance with an embodiment of the present disclosure.

Referring next to FIG. 12, there is shown an optical arrangement 1200 (such as the optical arrangement of FIG. 1) comprising an internal support rail, in accordance with an embodiment of the present disclosure. As shown, the optical arrangement 1200 comprises an optical element 1202 (such as the optical element of FIG. 1), a light source 1204, and an internal support rail 1226. In such an example embodiment, the internal support rail 1226 is positioned in a manner that the internal support rail 1226 provides a support to the light source 1208. Notably, one or more ends of the internal support rail 1226 optionally extend inside the optical element 1202 in a manner that no obstruction is faced by the emitted light inside the optical element 1202. Such a construction of the internal support rail 1226 beneficially provides flexibility in design of the optical configuration and enhances the visual appearance of lighting assembly without affecting the light distribution thereof when in operation.

Referring next to FIG. 13, there is shown an illustration of an exemplary lighting assembly 1300, in accordance with an embodiment of the present disclosure. The lighting assembly 1300 comprises an optical arrangement 1302 (such as the optical arrangement of FIG. 1) including an optical element 1304 and a housing 1306 supporting the optical arrangement 1302. Notably, the optical element 1304 comprises a first portion 1308 having an input face and an output face, and is shaped to provide an internal cavity 1310, and one or more second portions 1312 extending from the first portion 1308. Moreover, the optical element further includes a light source 1314 arranged inside the internal cavity 1310 to emit light. Herein, the light emitted from the light source 1314 enters the first portion 1308 and the one or more second portions 1312, wherein the one or more second portions 1312 function as a light-guide causing total internal reflection of the emitted light from the light source 1314 received therein, to redirect received light thereby. The housing 1306 has one or more features to allow for mounting or attachment of the lighting assembly to a physical structure in a ceiling or a wall of a building.

The term "lighting assembly" as used herein generally refers to any lighting assembly for use both in general and specialty lighting arrangements, for example fixtures. The term general lighting includes use in living spaces such as lighting in industrial, commercial, residential and transportation vehicle applications. The term specialty lighting includes emergency lighting activated during power failures, fires or smoke accumulations in buildings, microscope, stage illuminators, and billboard front-lighting, hazardous and difficult access location lighting, backlighting for signs, agricultural lighting and so forth.

The term "housing" as used herein refers to an outer covering that encloses and supports the optical arrangement 1302. Notably, the housing 1306 has a hollow space in order to accommodate the optical arrangement therein. Beneficially, the housing supports various components of the optical arrangement 1302 for example, such as the optical element 1304, light source 1314, and so forth. Notably, the housing 1306 holds the light source 1314 and the optical element 1304 in place, thereby allowing the emitted light from the light source 1314 to enter the optical element 1304 via the input face of the first portion 1308 of the optical element 1304.

Figure 14A:
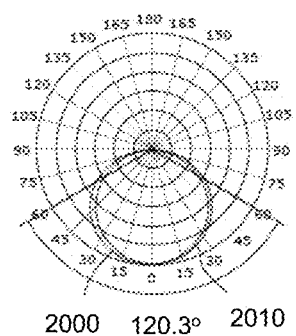
FIG. 14A-F are illustrations of various polar emission patterns that are achieved in operation when employing various differing optical arrangement embodiments.
Figure 14B:
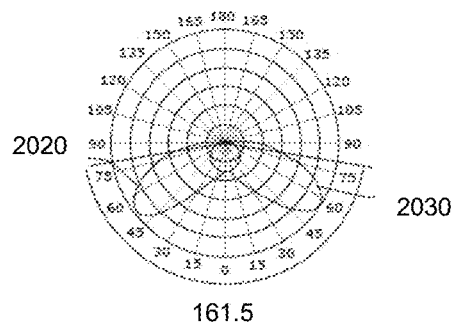
Figure 14C:
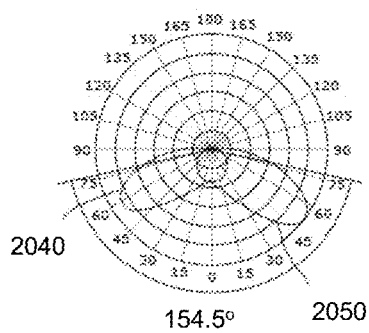
Figure 14D:
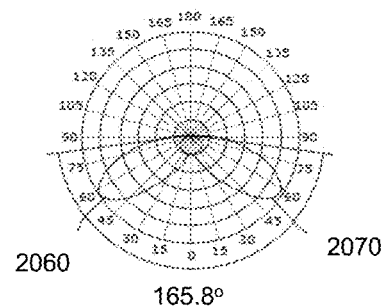
Figure 14E:
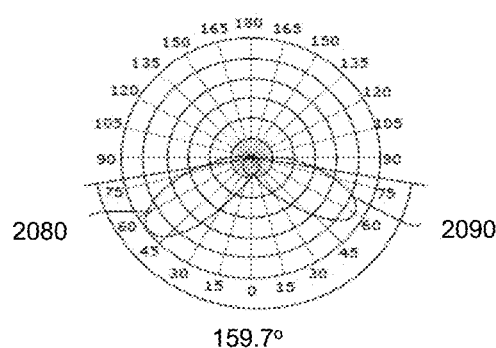
Figure 14F:
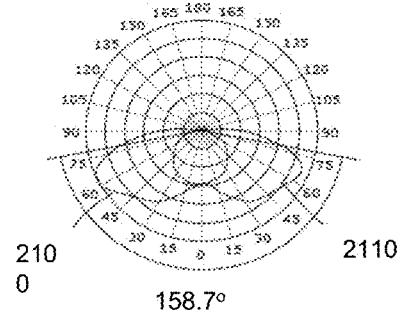

Referring to FIG. 14A-F, there are shown polar plots of emission characteristics of optical arrangements pursuant to the present disclosure. In FIG. 14A, a single polar lobe 2000, 2010 is emitted having an angular extent of 120.3°; such a single polar lobe 2000, 2010 provides highly effective illumination in a downwards direction when 0° corresponds to a vertical axis. However, it is more usual in the optical arrangement to provide two polar lobes that are have various polar angles of emission, for example two polar lobes 2020, 2030 providing 161.5° in FIG. 14B, two polar lobes 2040, 2050 providing 154.5° in FIG. 14C, and two polar lobes 2060, 2070 providing 165.8° in FIG. 14D, in a symmetrical manner about 0°. By suitable asymmetrical design of refractive elements of the optical arrangement, an asymmetrical polar distribution of two lobes 2080, 2090 providing 159.7° can be achieved, as illustrated in FIG. 14E. Moreover, more complex shapes to lobes 2100, 2110 of emission are feasible as illustrated in FIG. 14F and provides an illumination range of 158.7°.

FIG. 15 is a table of data from optical measurements performed on differing optical arrangement embodiments setup similar to the embodiment of FIG. 1C but with slight variation for each embodiment. The first row reference case is configured with no optical element and a white LED board as the light source board. This case is the highest efficacy and correspondingly has a normalized ranking of 100% in addition to efficacy in lumens/watt which evaluates total luminous output, there are metrics for peak intensity in candelas and beam angle in degrees. Important criteria not included in this table are glare, visual appearance of the optical element during on and off states, and the visual appearance of the light distribution as projected onto surface. All of the embodiments showed advantages for at least some of these criteria vs. typical commercial lighting optical systems. Embodiment A9 can be considered a second reference as it contains as a reflective layer only the surface of a standard white LED board. Compared to that with a normalized efficacy ranking of 86%, options with inserted or optically coupled reflective layers showed improved efficacy with the optically coupled options (coating or laminating onto the opposing surface of the optical element) showing the highest efficacy at 93-94% as compared to the reference without optical element. Embodiments A5 and A6 had the lowest efficacy due to a black reflector film (A6) and a black coating onto the opposing surface of the optical element (A5). Despite the black reflector, normalized values were over 70% at 79% and 72% respectively and the appearance of the embodiments in the off state is very black, a unique and desirable aesthetic for some applications where the efficacy tradeoff is acceptable.

Figure 16:
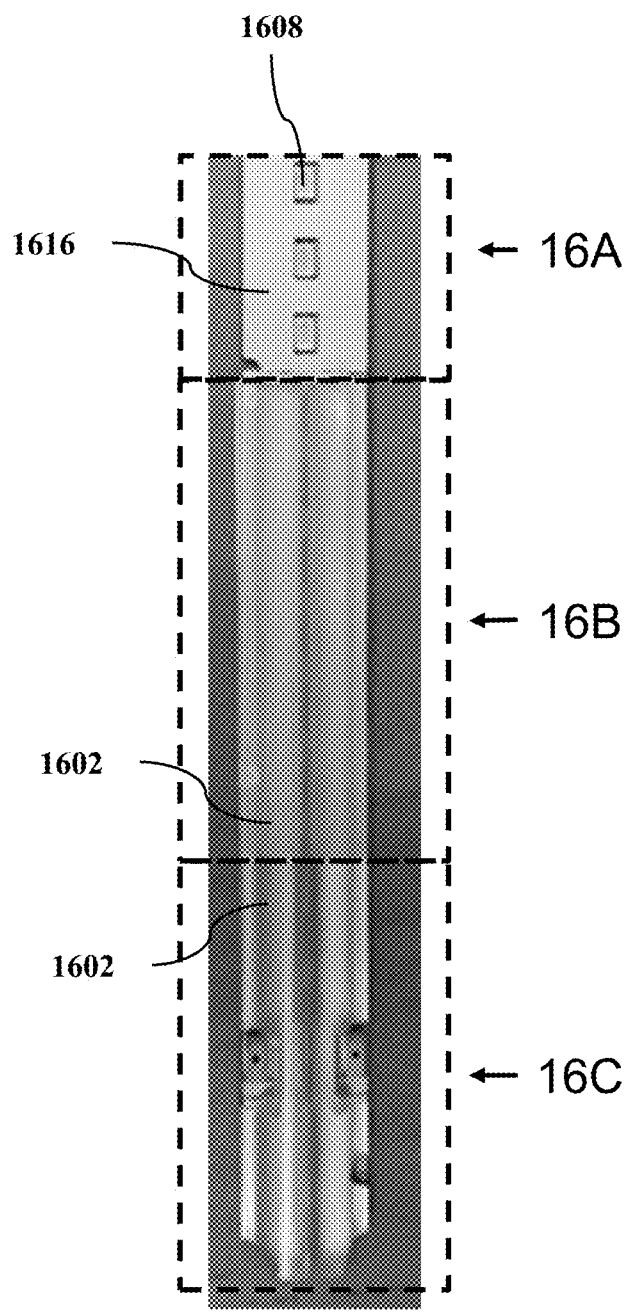
FIG. 16-19 illustrate the visual appearance effects of specific embodiments, FIG. 16 being focused on the appearance of embodiments with differing white reflector options and FIG. 17-19 documenting appearance of embodiments having black reflectors.
Figure 17:
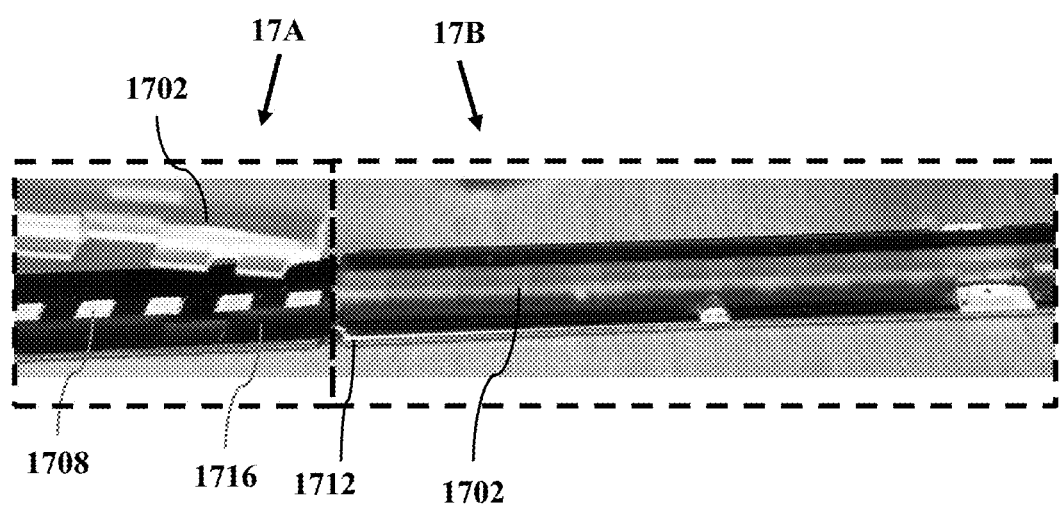
Figure 18:
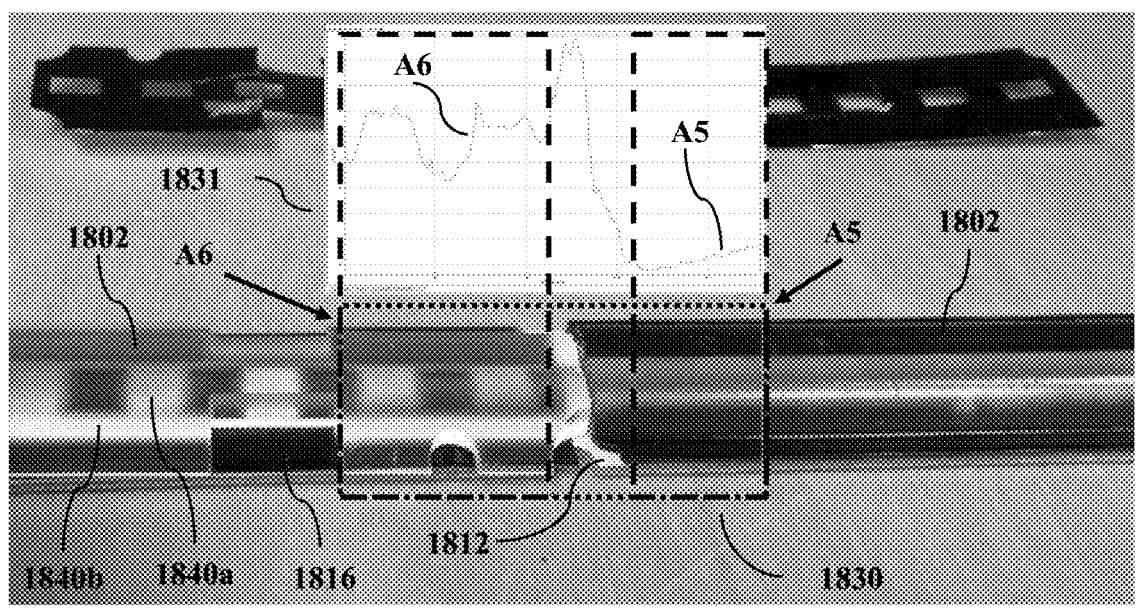
Figure 19:
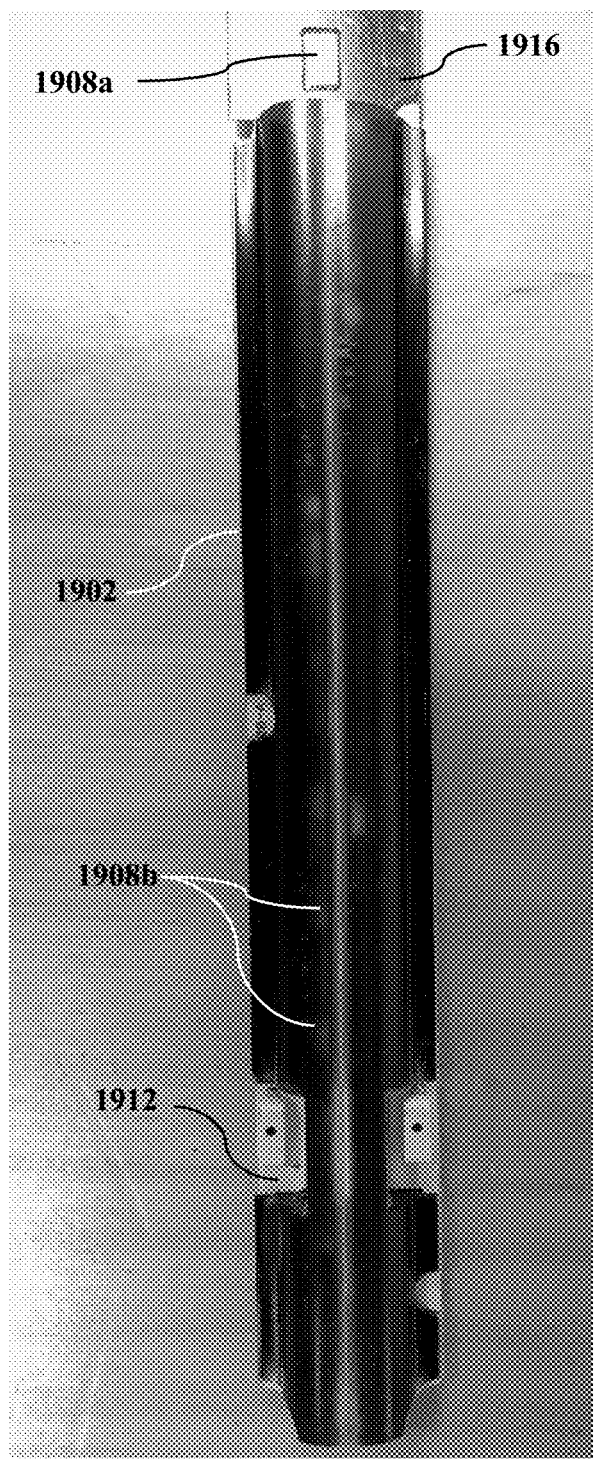
Figure 28:
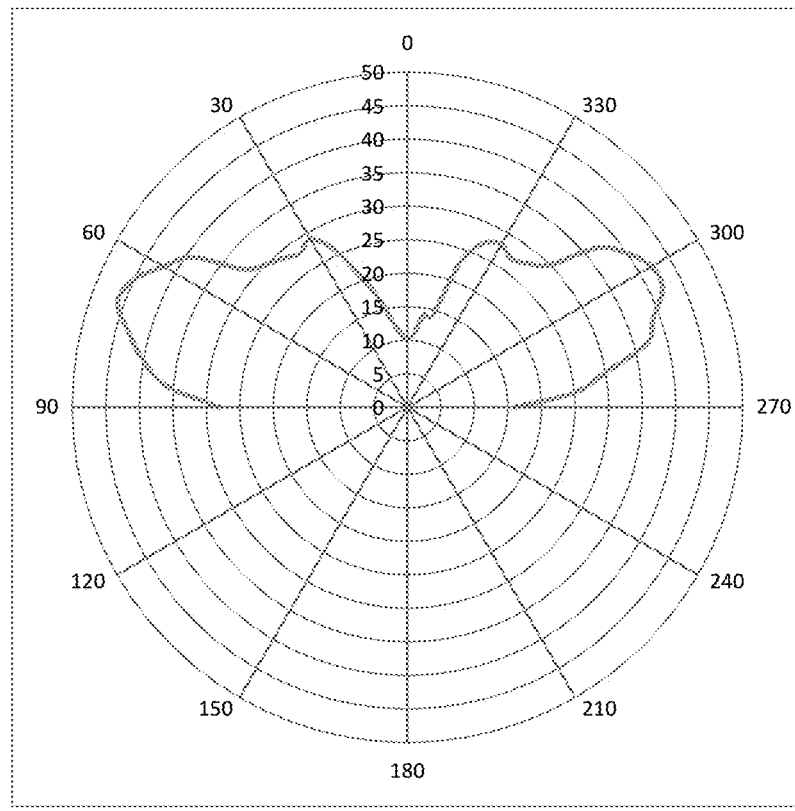

FIG. 16-19 illustrate the visual appearance effects of specific embodiments, FIG. 16 being focused on the appearance of embodiments with differing white reflector options and FIG. 17-19 documenting appearance of embodiments having black reflectors.

FIG. 16 is a head-on photo comparing the visual appearance of an optical arrangement with and without white reflectors optically coupled to the optical element. The image of FIG. 16 is segmented into 3 zones, 16A, 16B, and 16C. Zone 16A shows the underlying white LED board including LEDs 1608 protruding through the white reflective stencil 1616 covering the LED board. There is no optical element in zone 16A. Zone 16B shows the white reflective stencil 1616 optically coupled, laminated in this case, to the opposing side (back side in this view) of the optical element 1602. Zone 16C shows the optical element 1602 positioned on top of, but not optically coupled to the white reflective stencil film 1616. Comparing the visual appearance of the optical element with (Zone 16B) and without (Zone 16C) optical coupling shows that the optically coupled embodiment of Zone 16B is significantly more uniform in appearance than the Zone 16C uncoupled embodiment. This appears to be due to more internal specular reflected light inside the uncoupled Zone 16C embodiment. Ambient light from the room is entering both embodiments but is more diffusely reflected within the Zone 16B optically coupled embodiment. In alternative embodiments other colors, patterns, and/or images can be optically coupled to the opposing face of an optical element to create an appearance significantly the same as the optically coupled reflective layer. For example, the applied reflective layer could made to look like a wall or ceiling so that an optical element can be visually suppressed or hidden from view.

FIG. 17 shows an image of embodiment A6 from the table in FIG. 15. The photo image is divided into two zones; the exploded view of Zone 17A and the assembled view of Zone 17B. Zone 17A shows the black stencil reflector 1716 layered on top of the LED board 1712. Visible through the black stencil reflector are LEDs 1708. The optical element 1702 is raised off of the black stencil reflector. In Zone 17B, the optical element 1702 is positioned onto the black stencil reflector but not optically coupled. The image of the optical element in the assembled Zone B configuration is dark with a small amount of internal reflection.

FIG. 18 compares embodiments A5 and A6 from the table in FIG. 15. Both embodiments have the same LED board 1812 and black reflectors but differ in that embodiment A5 has a black reflector coating optically coupled to the opposing side of the optical element 1802 while embodiment A6 has an uncoupled black reflective layer which is a black reflective stencil 1816. Within the image of FIG. 18, there is an image Zone 1830 that is divided into Zone A6 (left side) that is an image of the uncoupled embodiment and Zone A5 (right side) that is an image of the optically coupled A5 embodiment. Also in FIG. 18 is superimposed in alignment with the image zone 1830 is an intensity plot 1831 which shows grayscale brightness values for each embodiment A6 and A5. Clearly the optically coupled embodiment A5 is visually much darker than the non-coupled A6 embodiment and this is demonstrated in the intensity plot of gray scale values. Visible in the image of FIG. 18 embodiment A6 are bright regions 1840a and 1840b which appear to be caused by specular internal reflection within the optical element 1802 of ambient light from overhead lights within the room. The black optically coupled coating of embodiment A5 appears to be suppressing or eliminating internal specular reflection within the optical element.

FIG. 19 is a head-on view of embodiment A5 from the table in FIG. 15 and illustrates a very dark appearance. This embodiment has an optical element 1902 with an optically coupled black coating on the opposing surface and is positioned on a black stencil reflector 1916 itself positioned on a white LED board 1912. LED 1908a is visible through the black stencil in a section of the image where the optical element is removed but LEDs 1908b covered by the optical element 1902 are barely visible.

FIG. 20-28 illustrate embodiment polar plot light distributions achieved with a corresponding different optical element geometry shown in each figure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:
1. A lighting arrangement comprising:
  A. an optical composite comprising;
    I) a light transmitting element comprising a volume of light transmissive and light scattering material having the three dimensional form of a two dimensional cross sectional profile area linearly extruded in a longitudinal direction, further comprising;

a. a first portion further comprising a first portion output face, an internal cavity within the first portion, and an input face formed by the boundary of the internal cavity;
b. a second portion extending from the first portion away from the longitudinal axis further comprising a second portion output face, a second portion opposing face, and a second portion edge face;
c. an opposing face not intersecting with either the first portion output face or the second portion output face;
II) an optically opaque layer optically coupled with a portion of the opposing face so as to reflect or absorb a portion of ambient light or light that is input from within the internal cavity;
B. an LED light source module comprising an LED light source and a light source board wherein the light source module is arranged to input light into the internal cavity such that light emitted from the light source enters the input face of the optical element;
C. a housing;
D. a light transmissive sheet positioned proximate to the opposing face of the light transmitting element.

2. The lighting arrangement of claim 1 further comprising a supplemental reflector.

3. The lighting arrangement of claim 2 wherein the supplemental reflector is a portion of a light fixture housing.

4. The lighting arrangement of claim 1 wherein the light source is recessed within an opening in the opaque layer of the optical composite.

5. The lighting arrangement of claim 4 wherein the angular input angle is restricted to the first portion of the light transmitting element.

6. The lighting arrangement of claim 1 wherein the LED board is positioned at the surface of the light transmissive sheet.

7. The lighting arrangement of claim 1 further comprising a reflective layer positioned to partially reflect light transmitted from the opposing face of the light transmitting element back into the light transmitting element.

8. The lighting arrangement of claim 1 used to provide a direct-indirect light distribution in a light fixture.

9. The optical arrangement of claim 1 wherein the opaque layer is coated, laminated, or otherwise adhered to the light source board.

10. The lighting arrangement of claim 1 wherein diffuse reflection or absorption of ambient light by the optically coupled optically opaque layer lowers the peak brightness of the light transmitting element when viewed in the unlit off state from within an illuminated application space.

11. The lighting arrangement of claim 1 wherein diffuse reflection or absorption of ambient light by the optically coupled optically opaque layer increases brightness uniformity of the light transmitting element when viewed in the unlit off state from within an illuminated application space.

12. The lighting arrangement of claim 1 wherein the light distribution is a bi-lobed or batwing distribution.

13. The lighting arrangement of claim 1 wherein the light distribution is a direct/indirect distribution.

14. The lighting arrangement of claim 1 further comprising an electrical connector mounted on the opposite surface of the printed circuit board to the LED light source.

15. The lighting arrangement of claim 1 further comprising an electrical connector mounted on the same surface of the printed circuit board to the LED light source.

16. A lighting arrangement of claim 1 further comprising a housing which holds in optical alignment the optically transmitting element by partially enclosing and retaining at least one second portion of the optically transmitting element.

17. The lighting arrangement of claim 1 wherein the light transmitting element of the optical composite comprises an optically transmissive bulk material with dispersed regions of optically transmissive material within the bulk material wherein refractive index of the dispersed regions is different than the refractive index of the bulk matrix material.

18. The lighting arrangement of claim 1 wherein the light transmitting element wherein the optically opaque layer is optically coupled by use of an adhesive bond, a solvent lamination bond, ultrasonic welding, co-extrusion or other means of attachment that results in lack of air gap between the optically opaque layer and optical element opposing face.

19. The lighting arrangement of claim 1 wherein the optically opaque layer is a coating bonded to an opposing face of the optical element.

20. The lighting arrangement of claim 1 wherein the optically opaque layer is a reflector.

21. The lighting arrangement of claim 20 wherein the reflector produces specular reflectance.

22. The lighting arrangement of claim 20 wherein the reflector produces diffuse reflectance.

23. The lighting arrangement of claim 1 wherein both or either the first portion output surface and second portion output surface have a matte finish.

24. The lighting arrangement of claim 1 wherein the output face of the first portion of the light transmitting element of the optical composite comprises surface features formed thereon to redirect light from the first portion to an ambient environment.

25. The lighting arrangement of claim 24 wherein the surface features are arranged in a pattern.

26. The lighting arrangement of claim 24 wherein the surface features comprise a lenticular pattern formed by at least one of extruding and embossing of the first portion output surface.

27. The lighting arrangement of claim 24 wherein the surface features comprise a full or partial geometric shape of one or more of a polygon, a truncated polygon, a concave polygon, a convex polygon, a sphere, an arc, a parabola, an ellipse, a paraboloid, an ellipsoid, a polyhedron, and a polyhedral frustum.

28. The lighting arrangement of claim 1 further comprising a light scattering layer positioned at the input face of the internal cavity of the optical composite light transmitting element.

29. The lighting arrangement of claim 28 wherein the light scattering layer is optically coupled to the input face.

30. The lighting arrangement of claim 29 wherein the light scattering layer is optically coupled by use of an adhesive bond, a solvent lamination bond, ultrasonic welding, co-extrusion or other means of attachment that results in lack of air gap between the optically opaque layer and optical element opposing face.

* * * * *